US012807525B2

(12) United States Patent
Yoshikawa et al.

(10) Patent No.: US 12,807,525 B2
(45) Date of Patent: Nov. 24, 2026

(54) METHOD OF MANUFACTURING OPTICAL FIBER AND APPARATUS FOR MANUFACTURING OPTICAL FIBER

(71) Applicant: SUMITOMO ELECTRIC INDUSTRIES, LTD., Osaka (JP)

(72) Inventors: Satoshi Yoshikawa, Osaka (JP); Manabu Shiozaki, Osaka (JP); Kazuyuki Sohma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 42 days.

(21) Appl. No.: 18/842,436

(22) PCT Filed: Mar. 2, 2023

(86) PCT No.: PCT/JP2023/007923
§ 371 (c)(1),
(2) Date: Aug. 29, 2024

(87) PCT Pub. No.: WO2023/167304
PCT Pub. Date: Sep. 7, 2023

(65) Prior Publication Data

US 2025/0197271 A1 Jun. 19, 2025

(30) Foreign Application Priority Data

Mar. 3, 2022 (JP) ................................. 2022-032800
Mar. 3, 2022 (JP) ................................. 2022-032803

(51) Int. Cl.
*C03B 37/025* (2006.01)
*C03B 37/035* (2006.01)
*C03C 25/106* (2018.01)

(52) U.S. Cl.
CPC ........ *C03B 37/0253* (2013.01); *C03B 37/035* (2013.01); *C03C 25/106* (2013.01)

(58) Field of Classification Search
None
See application file for complete search history.

(56) References Cited

U.S. PATENT DOCUMENTS 4,744,390 A * 5/1988 Henry ................... F16K 5/0292 294/1.3
5,233,200 A * 8/1993 DiMarcello ............. G01L 5/105 356/73.1

(Continued)

FOREIGN PATENT DOCUMENTS

CN 110431117 A 11/2019
CN 111302617 A * 6/2020 ............. B01D 50/20

(Continued)

OTHER PUBLICATIONS

JP-2006290655-A Clarivate Analytics Machine Translation retrieved Apr. 1, 2026. (Year: 2026).*

(Continued)

*Primary Examiner* — Lisa L Herring
(74) *Attorney, Agent, or Firm* — McDonald Hopkins LLC

(57) ABSTRACT

This optical fiber manufacturing method comprises: melting an optical fiber preform and drawing a bare optical fiber; cooling the bare optical fiber with a plurality of contactless guides while changing the direction of the bare optical fiber with the plurality of contactless guides; coating the bare optical fiber with a resin. Each contactless guide has, along an outer peripheral surface thereof, a guide portion which can wind a portion of the bare optical fiber. The guide portion is provided with a blow-out port that blows out a gas for causing the bare optical fiber to float. The position of at least one contactless guide among the plurality of contactless guides is adjusted to increase or decrease the winding length of the bare optical fiber relative to the plurality of (Continued)

contactless guides, thereby controlling the cooling performance of the bare optical fiber.

9 Claims, 14 Drawing Sheets

(56) References Cited

U.S. PATENT DOCUMENTS

| | | | | |
|---|---|---|---|---|
| 2016/0168008 | A1* | 6/2016 | Bookbinder | C03B 37/025 65/435 |
| 2016/0185661 | A1* | 6/2016 | Okada | C03B 37/0253 65/432 |
| 2016/0229734 | A1* | 8/2016 | Okada | C03B 37/0253 |
| 2020/0048138 | A1 | 2/2020 | Ishida | |
| 2022/0073408 | A1* | 3/2022 | Gregorski | C03B 37/032 |

FOREIGN PATENT DOCUMENTS

| | | | | |
|---|---|---|---|---|
| JP | 2006290655 | A * | 10/2006 | C03C 25/106 |
| JP | 2016147771 | A | 8/2016 | |
| JP | 2017160059 | A | 9/2017 | |
| JP | 2018-503580 | A | 2/2018 | |
| JP | 2018532674 | A | 11/2018 | |
| JP | 2020026371 | A | 2/2020 | |
| JP | 2021-042096 | A | 3/2021 | |
| JP | 2021147285 | A | 9/2021 | |
| WO | 2016/089733 | A2 | 6/2016 | |
| WO | 2017038396 | A1 | 3/2017 | |
| WO | 2017044543 | A1 | 3/2017 | |

OTHER PUBLICATIONS

CN-111302617-A Clarivate Analytics Machine Translation retrieved Apr. 1, 2026. (Year: 2026).*

International Search Report issued in Patent Application No. PCT/JP2023/007923 dated May 16, 2023.

* cited by examiner

METHOD OF MANUFACTURING OPTICAL FIBER AND APPARATUS FOR MANUFACTURING OPTICAL FIBER

TECHNICAL FIELD

The present disclosure relates to a method of manufacturing an optical fiber and an apparatus for manufacturing an optical fiber.

This application claims priority based on Japanese Patent Applications No. 2022-032800 and No. 2022-032803 filed on Mar. 3, 2022, and the entire contents of the Japanese patent applications are incorporated herein by reference.

BACKGROUND ART

PTL 1 discloses an example of a method of manufacturing an optical fiber. In this manufacturing method, an optical fiber preform is melted and drawn, and a coating resin is provided on the outer periphery of the drawn bare optical fiber. The drawn bare optical fiber is cooled while changing its direction by a direction changer (contactless guide) before being coated with the resin. During this cooling, the length of the bare optical fiber between the contactless guides is adjusted by moving the position of the contactless guides in the horizontal direction based on the outer diameter value of the coating resin of the bare optical fiber.

CITATION LIST

Patent Literature

PTL 1: Japanese Unexamined Patent Application Publication No. 2016-147771

SUMMARY OF INVENTION

Means for Solving the Problem

The present disclosure provides a method of manufacturing an optical fiber. The method of manufacturing an optical fiber includes, melting an optical fiber preform and drawing a bare optical fiber, cooling the bare optical fiber by a plurality of contactless guides while changing a direction of the bare optical fiber by the plurality of contactless guides, and coating the bare optical fiber with a resin. Each of the contactless guides includes a guide portion extending along an outer peripheral surface, the guide portion being configured to allow a portion of the bare optical fiber to be wound around the guide portion, and the guide portion has an outlet through which a gas for floating the bare optical fiber is blown out. A capacity of cooling the bare optical fiber is controlled by adjusting a position of at least one contactless guide of the plurality of contactless guides and increasing or decreasing a winding length of the bare optical fiber with respect to the plurality of contactless guides.

DETAILED DESCRIPTION

Figure 1:
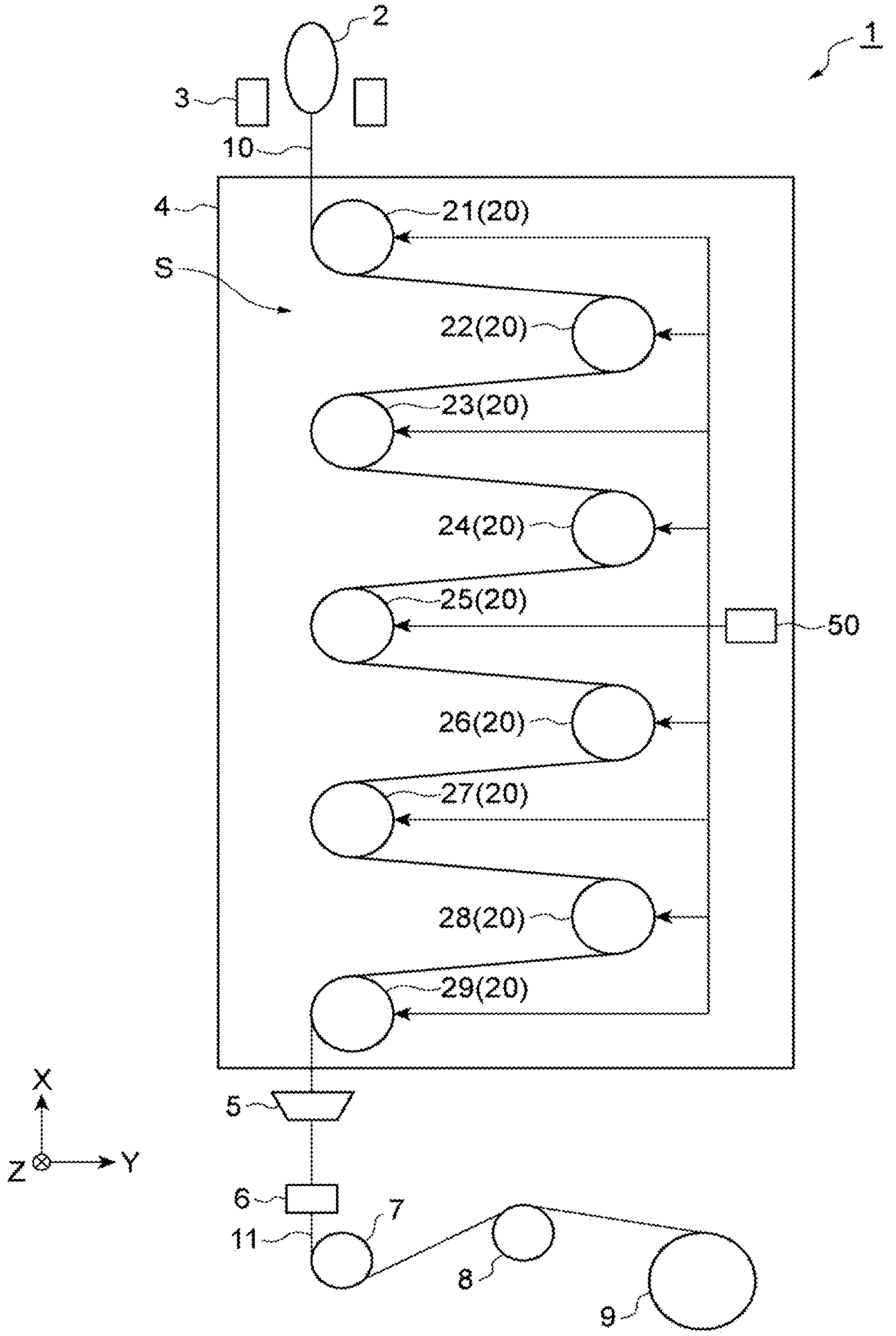
FIG. 1 is a schematic view of a manufacturing apparatus of an optical fiber according to an embodiment.

Problems to be Solved by Present Disclosure

In the above-described method of simply adjusting the length of the bare optical fiber between the contactless guides, the variation range of the cooling degree of the bare optical fiber is small, and it may be difficult to achieve desired cooling efficiency. In addition, there are many cases where the size of the equipment is spatially limited, and the contactless guide may not be largely traversed in the horizontal direction. Therefore, there is a demand for a technique capable of appropriately controlling the capacity of cooling of the bare optical fiber with compact equipment.

Advantageous Effects of Present Disclosure

According to the present disclosure, it is possible to appropriately control the capacity of cooling of a bare optical fiber using a contactless guide.

Description of Embodiments of Present Disclosure

First, the contents of embodiments of the present disclosure will be listed and explained. A method of manufacturing an optical fiber according to the embodiment includes, melting an optical fiber preform and drawing a bare optical fiber, cooling the bare optical fiber by a plurality of contactless guides while changing a direction of the bare optical fiber by the plurality of contactless guides, and coating the bare optical fiber with a resin. Each of the contactless guides includes a guide portion extending along an outer peripheral surface, the guide portion being configured to allow a portion of the bare optical fiber to be wound around the guide portion, and the guide portion has an outlet through which a gas for floating the bare optical fiber is blown out. A capacity of cooling the bare optical fiber is controlled by adjusting a position of at least one contactless guide of the plurality of contactless guides and increasing or decreasing a winding length of the bare optical fiber with respect to the plurality of contactless guides.

In this method of manufacturing an optical fiber, the direction of the bare optical fiber is changed via the plurality of contactless guides, and the position of the plurality of contactless guides is adjusted to increase or decrease the winding length of the bare optical fiber, that is, the length of the portion where gas from the contactless guides more directly contacts the bare optical fiber. Such an increase or decrease in the winding length of the bare optical fiber has a greater effect on the cooling efficiency than an increase or decrease in the aerial length of the bare optical fiber between the contactless guides, that is, the length of the portion that simply passes through the gas atmosphere. Therefore, according to the manufacturing method described above, the cooling efficiency of the bare optical fiber can be adjusted in a wider range, and the capacity of cooling of the bare optical fiber can be appropriately controlled.

As an embodiment, at least one contactless guide of the plurality of contactless guides may be a moving contactless guide configured to be able to traverse in a horizontal direction. In the embodiment, the capacity of cooling the bare optical fiber may be controlled by adjusting a traverse distance of the moving contactless guide and increasing or decreasing the winding length. In this case, the moving contactless guide is moved along the horizontal direction. Therefore, compared to a case where the moving contactless guide is moved in an irregular direction, it is possible to easily calculate the winding length of the bare optical fiber and to easily control the capacity of cooling of the bare optical fiber.

As an embodiment, the plurality of contactless guides may be an odd number of contactless guides, the odd number being three or more. Among the plurality of contactless guides, a contactless guide at an even-numbered position from the optical fiber preform may be the moving contactless guide, and the winding length may be increased or decreased by causing the moving contactless guide to traverse in the horizontal direction. In this case, the entry position of the bare optical fiber to the contactless guide closest to the device for melting the optical fiber preform (which side of the contactless guide is in contact with the optical bare fiber) and the exit position of the bare optical fiber to the contactless guide closest to the device for coating the bare optical fiber can be in the same side. This facilitates management of the winding length.

As an embodiment, the plurality of contactless guides may be four or more contactless guides. Among the plurality of contactless guides, contactless guides other than a first contactless guide and a second contactless guide may be each the moving contactless guide, the first contactless guide being closest to the optical fiber preform, the second contactless guide being closest to a device configured to perform coating with the resin. The winding length may be increased or decreased by causing the moving contactless guide at an odd-numbered position from the optical fiber preform and the moving contactless guide at an even-numbered position from the optical fiber preform to traverse in directions differing from each other in the horizontal direction by distances substantially equal to each other. In this case, the lengths of the bare optical fiber between the contactless guides other than the first contactless guide and the second contactless guide are substantially the same, and the total winding length of the bare optical fiber (the total value of the winding lengths of the bare optical fiber with respect to each contactless guide) can be easily calculated. Therefore, it is easy to appropriately control the capacity of cooling of the bare optical fiber.

As an embodiment, the traverse distance of the moving contactless guide may be more than 0 mm and 350 mm or less. In this case, since the traverse distance is 350 mm or less, it is possible to suppress an increase in the size of the cooling mechanism of the optical fiber. In addition, when the traverse distance is 350 mm or less, the variation amount of the total winding length of the bare optical fiber with respect to the variation amount of the traverse distance is large. Therefore, the cooling efficiency of the bare optical fiber can be greatly adjusted by slightly increasing or decreasing the traverse distance, and the capacity of cooling of the bare optical fiber can be efficiently controlled.

As an embodiment, when the traversing of the moving contactless guide is finished, an imaginary line extending downward along the vertical direction from the contactless guide closest to the optical fiber preform among the plurality of contactless guides is coincident with an imaginary line extending downward along the vertical direction from the contactless guide closest to a device configured to perform coating with the resin among the plurality of contactless guides. In this case, it is easy to manage the winding length of the bare optical fiber with respect to the contactless guide, and the capacity of cooling of the bare optical fiber can be appropriately controlled.

As an embodiment, the moving contactless guide may be arranged traverse across an imaginary line extending downward along the vertical direction from the contactless guide of the plurality of contactless guides that is closest to the optical fiber preform. In this case, the increase/decrease range of the winding length of the bare optical fiber with respect to the contactless guide can be further increased, and the capacity of cooling of the bare optical fiber can be efficiently controlled. In addition, it is possible to suppress an increase in the size of the optical fiber cooling device.

As an embodiment, among the plurality of contactless guides, contactless guides adjacent to each other in a traveling direction of the bare optical fiber may be spaced apart from each other in a vertical direction. The plurality of contactless guides may be disposed at regular intervals such that a pitch width H between the plurality of contactless guides is larger than an outer diameter D2 of each of the plurality of contactless guides. In this case, since the contactless guides are separated from each other, the angle at which the traveling direction of the bare optical fiber drawn out from one contactless guide and entering the next contactless guide is inclined with respect to the horizontal direction can be changed according to the traverse distance of the contactless guides along the horizontal direction. Accordingly, it is possible to easily increase or decrease the winding length of the bare optical fiber with respect to the contactless guide. Therefore, it is possible to appropriately control the capacity of cooling of the bare optical fiber.

As an embodiment, in controlling of the capacity of cooling the bare optical fiber, a degree of cooling may be controlled by increasing or decreasing the winding length, and the winding length is increased or decreased in cooling of the bare optical fiber. When the cooling control is performed while performing the cooling process of the bare optical fiber, the cooling control of the bare optical fiber can be performed at a more appropriate timing, and the optical fiber with higher accuracy can be obtained. It is noted that, before performing the cooling process in the actual manufacturing process, the extent to which the winding length should be increased or decreased may be measured in advance. In this case, the cooling control does not need to be performed each time during manufacturing, and thus the manufacturing method can be simplified.

As an embodiment, in the cooling, a gas may be ejected from an inner side of at least one contactless guide of the plurality of contactless guides toward the bare optical fiber, and the gas may be dry air managed to have a dew point of 0 °C or less. In this method of manufacturing an optical fiber, gas (dry air) is ejected toward the bare optical fiber from the inner side of the contactless guide that changes the traveling direction of the bare optical fiber in a contactless manner. In this case, since the dry air is directly blown to the bare optical fiber in the region close to the bare optical fiber, the bare optical fiber can be efficiently cooled. In addition, the contactless guide changing a direction of the bare optical fiber by ejecting dry air without touching the bare optical fiber includes a portion (for example, a groove portion) that receives and guides the bare optical fiber. When the traveling direction of the bare optical fiber is changed, the ejected dry air is rapidly released from the narrow guide portion to a wide region in the entire portion along the contactless guide. At this time, there is a concern that a local temperature drop occurs due to the influence of adiabatic expansion, condensation of dry air occurs, and the condensation comes into contact with the bare optical fiber to cause disconnection. However, in this manufacturing method, since the dew point of the dry air is controlled to be 0 °C or less, such condensation is prevented. Therefore, according to this manufacturing method, it is possible to efficiently cool the bare optical fiber without causing disconnection of the bare optical fiber due to condensation. It is noted that, the dry air is not limited to air but may be any gas. The dry air may be, for example, nitrogen.

As an embodiment, in the cooling, the dry air may be supplied to the contactless guide through a gas filter having filtration accuracy of 0.03 μm or less. In this case, since impurities and the like are removed from the dry air directly blown to the bare optical fiber from the contactless guide, it is possible to prevent disconnection of the bare optical fiber due to collision of impurities and the like contained in the dry air. Thus, it is possible to efficiently cool the bare optical fiber without causing disconnection of the bare optical fiber.

As an embodiment, in the cooling, a supply amount of the dry air supplied to the contactless guide may be adjusted by an on-off valve having no metal sliding portion. In this case, it is possible to reduce dust (metal powder or the like) generated from the on-off valve that adjusts the supply amount of dry air to the contactless guide, and to prevent disconnection of the bare optical fiber due to dust generation. As the on-off valve having no metal sliding portion, for example, an air operated valve or the like can be used. A solenoid valve can be used to control opening and closing of the air-operated valve.

An optical fiber manufacturing apparatus according to an embodiment includes, a melting device, a cooling mechanism, and a coating device. The melting device is configured to melt an optical fiber preform to draw a bare optical fiber from the optical fiber preform. The cooling mechanism is configured to cool the bare optical fiber. The coating device is configured to coat the bare optical fiber with a resin. The cooling mechanism includes a plurality of contactless guides configured to change a traveling direction of the bare optical fiber. Each of the contactless guides includes a guide portion extending along an outer peripheral surface, the guide portion being configured to allow a portion of the bare optical fiber to be wound around the guide portion, and the guide portion has an outlet through which a gas for floating the bare optical fiber is blown out. At least one contactless guide of the plurality of contactless guides is a moving contactless guide configured to be movable to increase or decrease a winding length of the bare optical fiber with respect to the guide portion.

In this optical fiber manufacturing apparatus, the position of the plurality of contactless guides can be adjusted to increase or decrease the winding length of the bare optical fiber. As described above, the increase or decrease in the winding length of the bare optical fiber has a greater influence on the cooling efficiency than the increase or decrease in the aerial length of the bare optical fiber between the contactless guides. Therefore, by using the manufacturing apparatus, the cooling efficiency of the bare optical fiber can be adjusted in a wider range, and the capacity of cooling of the bare optical fiber can be appropriately controlled.

As an embodiment of the optical fiber manufacturing apparatus, the optical fiber manufacturing apparatus may further include, a device configured to cause the moving contactless guide to traverse. The moving contactless guide may be configured to be able to traverse in a horizontal direction. The plurality of contactless guides may be disposed to control a capacity of cooling the bare optical fiber by adjusting a traverse distance of the moving contactless guide and increasing or decreasing the winding length. In this case, the contactless guide moves along the horizontal direction. Therefore, compared to a case where the contactless guide moves in an irregular direction, it is possible to easily calculate the winding length of the bare optical fiber and to easily control the capacity of cooling of the bare optical fiber.

As an embodiment of the optical fiber manufacturing apparatus, the moving contactless guide may be arranged to traverse across an imaginary line extending downward along a vertical direction from a contactless guide of the plurality of contactless guides that is closest to the optical fiber preform. In this case, the increase/decrease range of the winding length of the bare optical fiber with respect to the contactless guide can be further increased, and the capacity of cooling of the bare optical fiber can be efficiently controlled. In addition, it is possible to suppress an increase in the size of the optical fiber cooling device.

As an embodiment of the optical fiber manufacturing apparatus, among the plurality of contactless guides, contactless guides adjacent to each other in the traveling direction of the bare optical fiber may be spaced apart from each other in a vertical direction. The plurality of contactless guides may be disposed at regular intervals such that a pitch width H between the plurality of contactless guides is larger than outer diameter D2 of each of the plurality of contactless guides. In this case, since the contactless guides are separated from each other, the angle at which the traveling direction of the bare optical fiber drawn out from one contactless guide and entering the next contactless guide is inclined with respect to the horizontal direction can be changed according to the traverse distance of the contactless guides along the horizontal direction. Accordingly, it is possible to easily increase or decrease the winding length of the bare optical fiber with respect to the contactless guide. Therefore, it is possible to appropriately control the capacity of cooling of the bare optical fiber.

As an embodiment of the optical fiber manufacturing apparatus, the contactless guides included in the cooling mechanism may be three to fifteen contactless guides. In this case, since the number of the bare optical fiber is three or more, the total winding length of the bare optical fiber can be adjusted. In addition, since the number of contactless guides is fifteen or less, an increase in the size of the optical fiber manufacturing apparatus can be suppressed.

As an embodiment of the optical fiber manufacturing apparatus, a winding diameter of each of the contactless guides may be 50 mm to 200 mm. In this case, since the winding diameter of each contactless guide is 50 mm or more, the winding length of the bare optical fiber with respect to each contactless guide can be sufficiently long, and the capacity of cooling of the bare optical fiber can be appropriately controlled. In addition, since the winding diameter of each contactless guide is 200 mm or less, an increase in the size of the optical fiber manufacturing apparatus can be suppressed.

As an embodiment of the optical fiber manufacturing apparatus, the optical fiber manufacturing apparatus may further include a supplying device configured to supply a gas to the cooling mechanism. The cooling mechanism may include at least three contactless guides configured to cause the gas to be ejected from an inner side toward an outer side to change the traveling direction of the bare optical fiber in a contactless manner. The gas supplied from the supplying device to the contactless guides may be dry air managed to have a dew point of 0 °C or less. In this case, since the dry air is directly blown to the bare optical fiber in the region close to the bare optical fiber, the bare optical fiber can be efficiently cooled. In addition, the contactless guide changing a direction of the bare optical fiber by ejecting dry air without touching the bare optical fiber includes a portion (for example, a groove portion) that receives and guides the bare optical fiber. When the traveling direction of the bare optical fiber is changed, the ejected dry air is rapidly released from the narrow guide portion to a wide region in the entire portion along the contactless guide. At this time, there is a concern that a local temperature drop occurs due to the influence of adiabatic expansion, condensation of dry air occurs, and the condensation comes into contact with the bare optical fiber to cause disconnection. However, in this manufacturing apparatus, since the dew point of the dry air is controlled to be 0 °C or less, such dew condensation is prevented. Therefore, according to the manufacturing apparatus, it is possible to efficiently cool the bare optical fiber without causing disconnection of the bare optical fiber due to dew condensation.

As an embodiment of the optical fiber manufacturing apparatus, the optical fiber manufacturing apparatus may further include a filter disposed between the contactless guides and the supplying device. The filter may be a gas filter having filtration accuracy of 0.03 μm or less. In this case, since impurities and the like are removed by the filter from the dry air directly blown to the bare optical fiber from the contactless guide, it is possible to prevent disconnection of the bare optical fiber due to collision of impurities and the like contained in the dry air. Thus, it is possible to efficiently cool the bare optical fiber without causing disconnection of the bare optical fiber.

As an embodiment of the optical fiber manufacturing apparatus, the optical fiber manufacturing apparatus may further include an on-off valve disposed between the contactless guides and the supplying device and configured to adjust a supply amount of the dry air supplied to the contactless guides. The on-off valve may be an on-off valve having no metal sliding portion. In this case, it is possible to reduce dust (metal powder or the like) generated from the on-off valve that adjusts the supply amount of dry air to the contactless guide, and to prevent disconnection of the bare optical fiber due to dust generation. It is noted that, as the on-off valve having no metal sliding portion, for example, an air operated valve or the like can be used. A solenoid valve can be used to control opening and closing of the air-operated valve.

Details of Embodiments of Present Disclosure

Specific examples of an optical fiber manufacturing apparatus and an optical fiber manufacturing method according to the present disclosure will be described below with reference to the drawings. In the following description, the same elements or elements having the same function will be denoted by the same reference signs and will not be described again. It is noted that, the present invention is not limited to these examples, but is defined by the scope of claims, and is intended to include all modifications within the meaning and the scope equivalent to the scope of claims.

Figure 2:
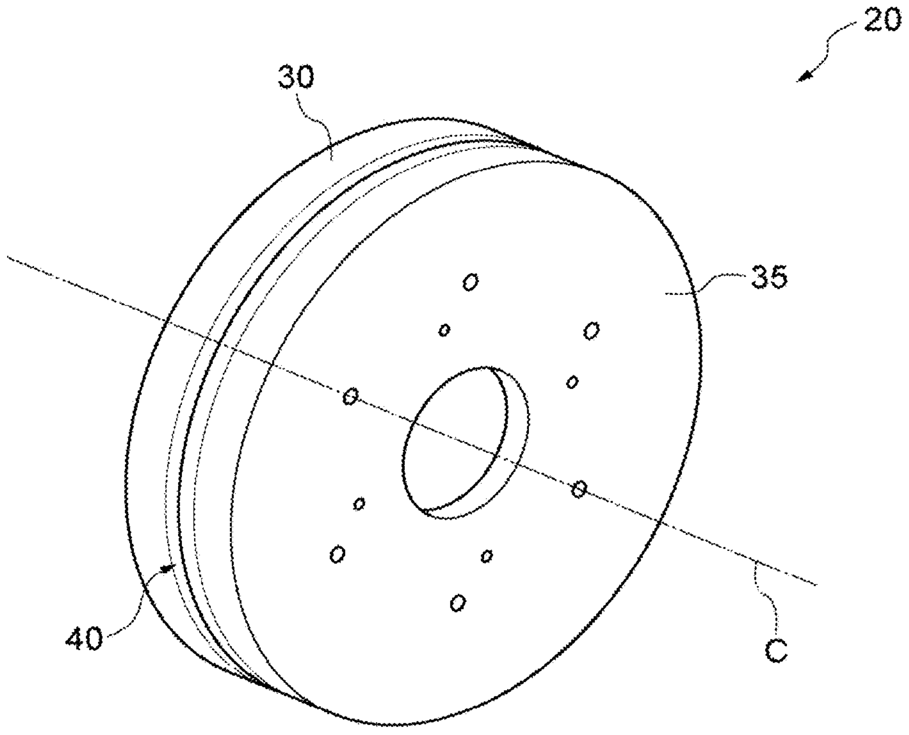
FIG. 2 is a perspective view showing a contactless guide of the optical fiber manufacturing apparatus shown in FIG. 1.

An optical fiber manufacturing apparatus and an optical fiber manufacturing method according to an embodiment will be described with reference to FIGS. 1 and 2. FIG. 1 is a schematic view of a manufacturing apparatus 1 of an optical fiber according to an embodiment. FIG. 2 is a perspective view showing a contactless guide 20. In the embodiment, the height direction (vertical direction) of manufacturing apparatus 1 is referred to as direction X, the width direction (horizontal direction) is referred to as a direction Y, and the depth direction is referred to as a direction Z. In the embodiment, direction X, direction Y and direction Z are orthogonal to each other.

As shown in FIG. 1, manufacturing apparatus 1 is an apparatus for manufacturing an optical fiber 11 by heating and melting an optical fiber preform 2 to draw a bare optical fiber 10 and providing a coating resin on the outer periphery of bare optical fiber 10. As shown in FIG. 1, manufacturing apparatus 1 includes a drawing furnace 3, a cooling portion 4, a coating portion 5, a hardening portion 6, a bottom roller 7, a pulling roller 8, and a winding portion 9 sequentially along a path through which bare optical fiber 10 and optical fiber 11 pass. Manufacturing apparatus 1 also includes a traverse device 50.

Drawing furnace 3 is a melting device for heating and melting optical fiber preform 2. Optical fiber preform 2 is heated and melted by drawing furnace 3 so that it can be drawn along the vertical direction (direction X shown in FIG. 1). Drawing furnace 3 has a heater positioned around optical fiber preform 2. Optical fiber preform 2 may be, for example, a glass body (preform) containing quartz glass. Drawn optical fiber preform 2 becomes bare optical fiber 10. Bare optical fiber 10 may be, for example, a glass wire including a core and a clad covering the outer periphery of the core. Drawn bare optical fiber 10 is sent to cooling portion 4.

Cooling portion 4 is a cooling mechanism for cooling bare optical fiber 10. Cooling portion 4 has an internal space S surrounded by an outer wall (including a sidewall, a top plate and a bottom plate), and bare optical fiber 10 passes through the internal space S. Since cooling portion 4 has the outer wall, it is possible to prevent broken bare optical fiber 10 from scattering, and it is also possible to suppress the foreign matters from entering into internal space S and to maintain the cleanliness of internal space S. The outer wall of cooling portion 4 may be made of transparent glass or resin so that the inside of cooling portion 4 can be checked.

Cooling portion 4 may have an inlet (not shown) for injecting a dry gas into internal space S to cool bare optical fiber 10 as a whole. The heat of bare optical fiber 10 is released to the outside by using the dry gas as a refrigerant. Cooling portion 4 may have an exhaust port (not shown) for discharging the drying gas. The height of cooling portion 4 in direction X (height of the sidewall) may be, for example, 1000 mm to 1600 mm. The widths of cooling portions 4 in direction Y (widths of the sidewall) may be, for example, 800 mm to 1400 mm. Although, by surrounding bare optical fiber 10 with the outer wall, it is possible to manage the dew point inside cooling portion 4 and to prevent the optical fiber from scattering at the time of disconnection, bare optical fiber 10 may be simply cooled by contactless guide 20 described later without being surrounded with the outer wall. In addition, even in the case where the optical fiber 10 is surrounded by the outer wall, the dry gas may not be injected into internal space S, and bare optical fiber 10 may be simply prevented from coming into direct contact with the outside air.

Bare optical fiber 10 passes through internal space S so as to meander while its traveling direction is changed by the plurality of contactless guides 20. Bare optical fiber 10 passes between contactless guides 20 in a direction inclined with respect to direction X and direction Y. Cooling portion 4 has nine contactless guides 21 to 29. Each of contactless guides 21 to 29 is provided in turn on the running path of bare optical fiber 10. Hereinafter, when it is not necessary to distinguish contactless guides 21 to 29 from each other, contactless guides 21 to 29 will be collectively referred to as contactless guide 20. The number of contactless guides 20 included in cooling portion 4 may be plural, and is not limited to nine. For example, cooling portion 4 may include three to fifteen contactless guides 20.

Contactless guide 20 is a member that changes the traveling direction of bare optical fiber 10 in a contactless state. Contactless guide 20 includes a first flange 30 and a second flange 35 as shown in FIG. 2. First flange 30 and second flange 35 are members having a circular disk shape, and are provided so as to overlap each other in the direction along a center axis C. Contactless guide 20 has a guide portion 40 between first flange 30 and second flange 35. Guide portion 40 is a gap provided between the outer edge of first flange 30 and the outer edge of second flange 35. Guide portion 40 is provided annularly along the outer periphery of contactless guide 20. Bare optical fiber 10 is passed through guide portion 40.

Figure 13:
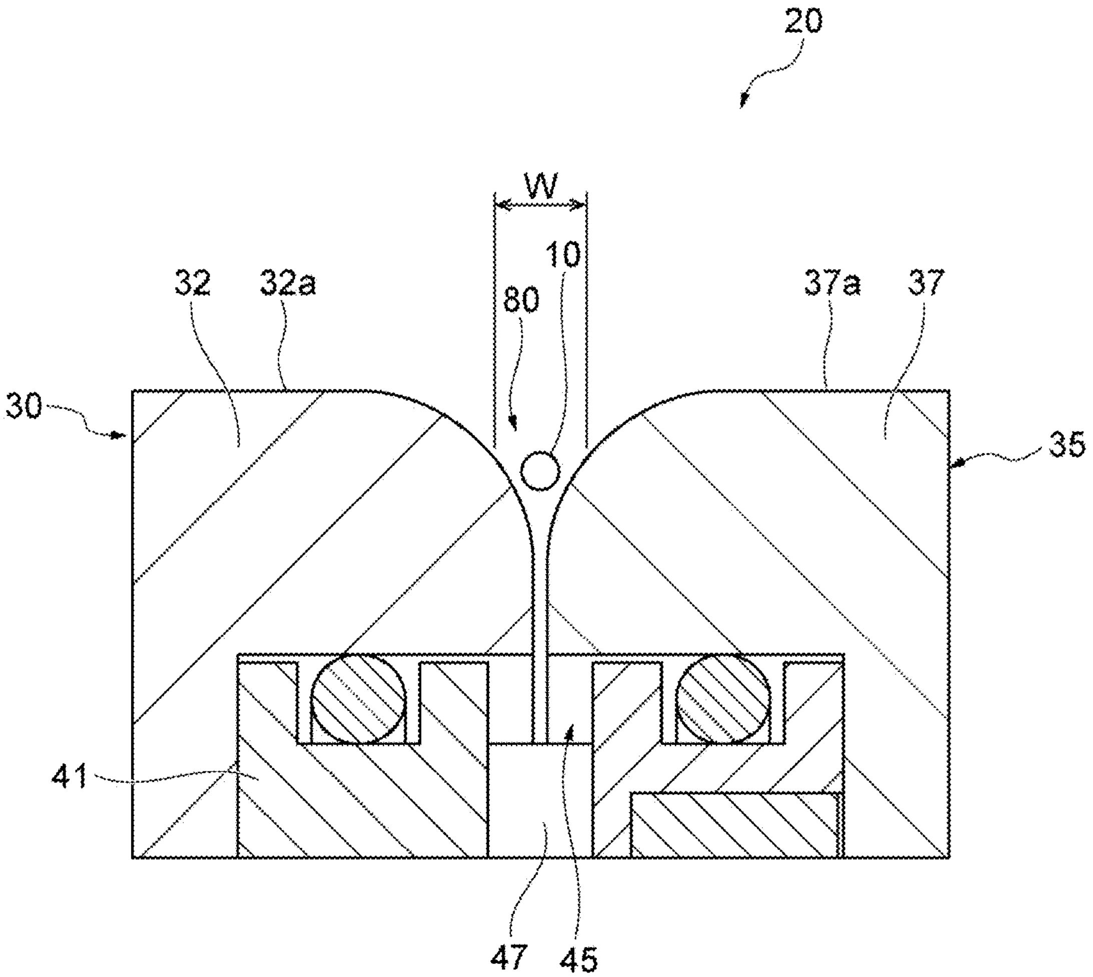
FIG. 13 is an enlarged cross-sectional view of the guide region of the contactless guide.

An inner member 41 is housed inside first flange 30 and second flange 35 (refer to FIG. 13). The internal member 41 is connected to an external gas supply source (such as an air pump). The inner member 41 blows the gas supplied from the gas supply source to the outside of contactless guide 20 through the outlet inside guide portion 40. The gas supplied from the gas supply source may be, for example, a dry gas filled in internal space S (refer to FIG. 1) of cooling portion 4. The blown gas is blown to bare optical fiber 10 passed through guide portion 40. Bare optical fiber 10 floats (the state shown in FIG. 13) by being sprayed with the gas, and is not in contact with first flange 30 and second flange 35.

Second flange 35 may be movably attached to the inner member 41. In this case, by moving second flange 35 to change the width of guide portion 40, the pressure of the gas blown out from guide portion 40 can be adjusted. The pressure of the gas blown out from guide portion 40 may be appropriately adjusted in accordance with the diameter, type, or the like of bare optical fiber 10 passed through guide portion 40. First flange 30 may be fixed to the inner member 41, or may be attached to the inner member 41 so as to be movable in a direction in which the width of guide portion 40 is changed, similarly to second flange 35.

At least one of contactless guides 20 is a moving contactless guide that is movable along direction Y across internal space S. In the manufacturing process of the optical fiber, the position of at least one contactless guide among the plurality of contactless guides 20 is adjusted to increase or decrease the winding length of bare optical fiber 10 with respect to contactless guide 20. Thus, the capacity of cooling of bare optical fiber 10 is controlled. The winding length of bare optical fiber 10 is a length of a portion (hereinafter, referred to as a wound portion) of bare optical fiber 10 passed through guide portion 40, the portion being positioned on a circle arc centered on center axis C of contactless guide 20.

In the embodiment, even-numbered contactless guides 20 (contactless guides 22, 24, 26 and 28) are moved along direction Y to the right in FIG. 1. The even-numbered contactless guide 20 is contactless guide 20 positioned at an even-numbered position from optical fiber preform 2, and is counted as an even-numbered position when contactless guides 20 are counted in the order in which bare optical fiber 10 passes. On the other hand, an odd-numbered contactless guide 20 is contactless guide 20 positioned at an odd-numbered position from the optical fiber preform, and is counted as an odd-numbered position when contactless guides 20 are counted in the order in which bare optical fiber 10 passes. In the embodiment, odd-numbered contactless guides 20 are contactless guides 21, 23, 25, 27 and 29.

Manufacturing apparatus 1 includes traverse device 50 for traversing each contactless guide 20. Here, traversing contactless guide 20 refers to moving contactless guide 20 along direction Y (horizontal direction). That is, traverse device 50 is configured to be able to move each contactless guide 20 along direction Y (horizontal direction). Each contactless guide 20 is attached to traverse device 50. Each contactless guide 20 may be attachable to and detachable from traverse device 50. That is, the number of contactless guides 20 included in cooling portion 4 may be changed. By changing the number of contactless guides 20, the total winding length of bare optical fiber 10 with respect to contactless guides 20 can be adjusted. The total winding length of bare optical fiber 10 is a total value of the winding lengths of bare optical fiber 10 with respect to respective contactless guides 20 included in cooling portion 4.

Bare optical fiber 10 moves in internal space S while its direction is changed by the plurality of contactless guides 20. Bare optical fiber 10 cooled by cooling portion 4 is sent to coating portion 5.

Coating portion 5 is a coating device that coats the outer periphery of bare optical fiber 10 with a coating resin. The coating resin is, for example, an ultraviolet curable resin. Coating portion 5 may apply two different types of coating resins to the outer circumference of bare optical fiber 10. In coating portion 5, for example, after the primary resin is coated on bare optical fiber 10, the secondary resin may be coated over the outer side of the primary resin. Coating portion 5 may apply the primary resin and the secondary resin to bare optical fiber 10 substantially simultaneously. Bare optical fiber 10 coated with the coating resin is sent to hardening portion 6.

Hardening portion 6 is a curing device that cures the coating resin applied to bare optical fiber 10 by irradiating ultraviolet rays. Hardening portion 6 has a light emitting element such as an ultraviolet lamp for emitting ultraviolet rays. When the coating resin applied to bare optical fiber 10 is cured, optical fiber 11 is completed. Optical fiber 11 is sent to the bottom roller 7.

The bottom roller 7 is a roller for changing the traveling direction of optical fiber 11 from a direction along direction X to a predetermined direction. Optical fiber 11 whose traveling direction has been changed by the bottom roller 7 is sent to the pulling roller 8. The pulling roller 8 is a roller that pulls and moves optical fiber 11. The moving speeds of bare optical fiber 10 and optical fiber 11 may be adjustable by changing the rotation speed of the pulling roller 8. Optical fiber 11 is sent from the pulling roller 8 to winding portion 9. Winding portion 9 is a member for winding optical fiber 11. Winding portion 9 may be, for example, a bobbin around which optical fiber 11 can be wound. Thus, the manufacturing process of optical fiber 11 is completed.

Figure 3:
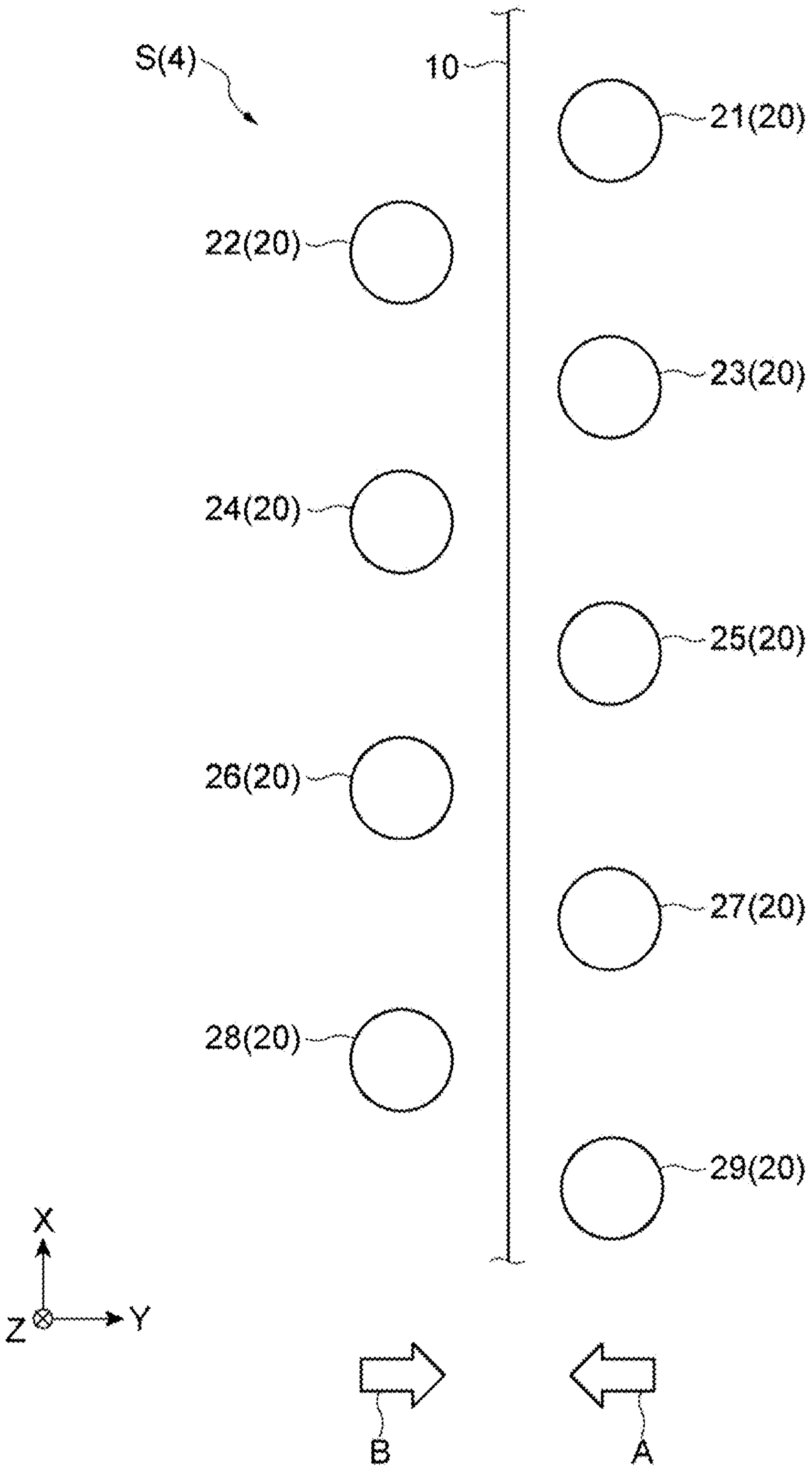
FIG. 3 is a view showing a state before the bare optical fiber is wound around the contactless guide in the internal space shown in FIG. 1.
Figure 4:
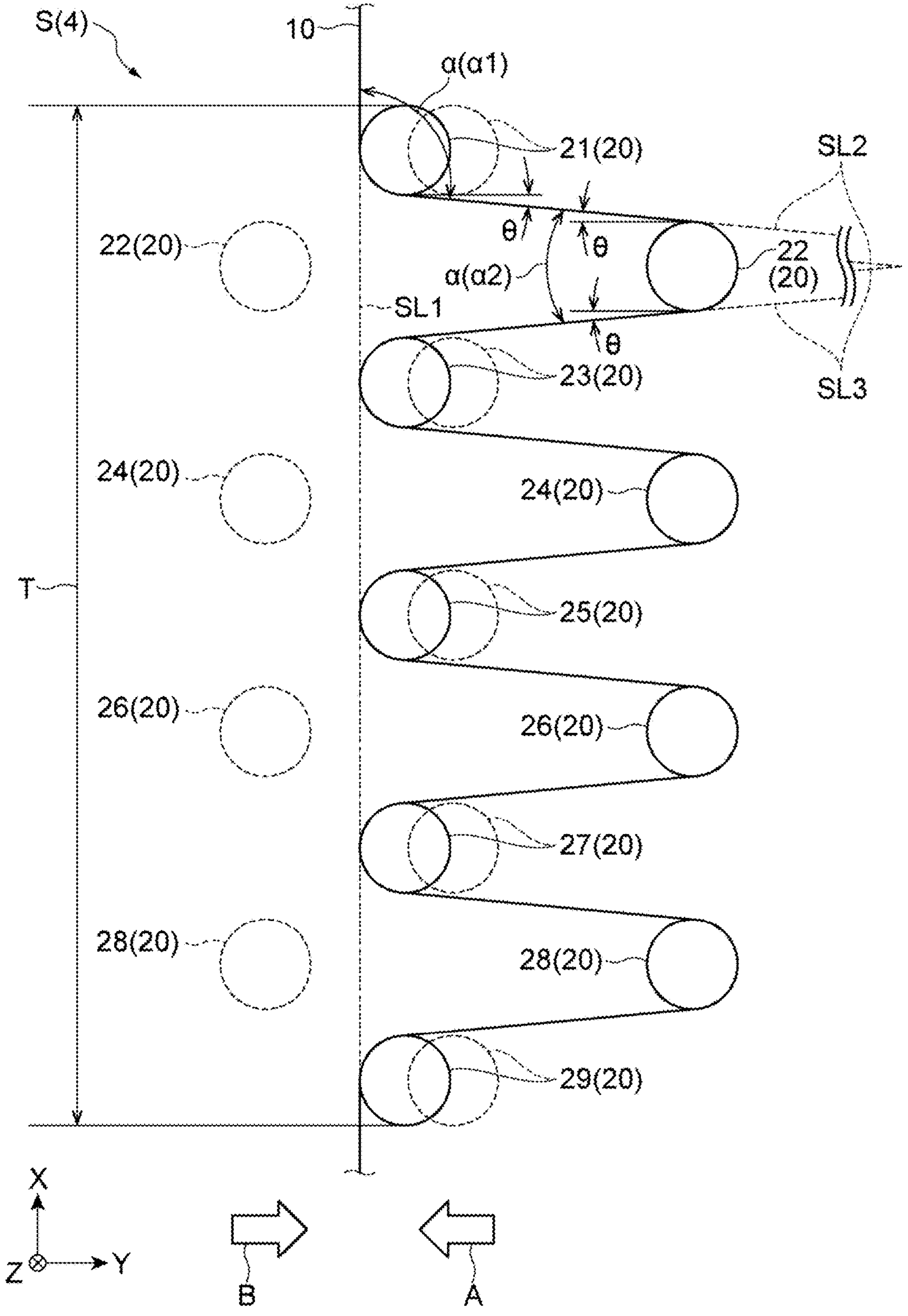
FIG. 4 is a view showing a state in which a bare optical fiber is wound around the contactless guide in the internal space shown in FIG. 1.

A method of winding bare optical fiber 10 around contactless guide 20 and a method of adjusting the winding length of bare optical fiber 10 will be described with reference to FIGS. 3 and 4. FIG. 3 is a view showing a state before bare optical fiber 10 is wound around contactless guide 20. FIG. 4 is a view showing a state in which bare optical fiber 10 is wound around contactless guide 20. In FIG. 4, bare optical fiber 10 and contactless guide 20 in a state before winding bare optical fiber 10 around contactless guide 20 are indicated by dashed lines, and bare optical fiber 10 and contactless guide 20 in a state after winding are indicated by solid lines.

In a state before bare optical fiber 10 is wound around contactless guide 20, as shown in FIG. 3, bare optical fiber 10 is arranged so as to extend along direction X. Bare optical fiber 10 is disposed so as to be sandwiched between odd-numbered contactless guides 20 and even-numbered contactless guides 20 in direction Y. The plurality of contactless guides 20 is arranged such that contactless guides 20 adjacent to each other in the traveling direction of bare optical fiber 10 are spaced apart from each other by a predetermined distance in direction X. That is, odd-numbered contactless guides 20 and even-numbered contactless guides 20 are alternately arranged so that their positions in direction X do not overlap with each other.

In this state, contactless guide 20 is traversed. Traversing of contactless guide 20 is performed using traverse device 50 (refer to FIG. 1) included in manufacturing apparatus 1. Odd-numbered contactless guides 20 and even-numbered contactless guides 20 are traversed in different directions toward bare optical fiber 10.

As shown in FIG. 4, odd-numbered contactless guides 20 traverses to a position where its outer edge approximately overlaps with bare optical fiber 10 extending in direction X (until bare optical fiber 10 passes through guide portion 40). The even-numbered contactless guides 20 traverse across an imaginary line extending downward along X axis from uppermost contactless guide 21 closest to optical fiber preform 2. The even-numbered contactless guides 20 pass between odd-numbered contactless guides 20, and are traversed to a position of the right side in FIG. 4 from the position where bare optical fiber 10 was disposed before the traversal. By traversing each contactless guide 20, bare optical fiber 10 is wound around the outer circumference (guide portion 40 shown in FIG. 2) of contactless guide 20.

By appropriately adjusting the traverse distance of contactless guide 20, the winding length of bare optical fiber 10 can be increased or decreased to control the capacity of cooling of bare optical fiber 10. The control of the capacity of cooling of bare optical fiber 10 (the operation of increasing or decreasing the winding length) may be performed in the cooling process of bare optical fiber 10 in the manufacturing process of the optical fiber. When the winding length is increased or decreased, all contactless guides 20 may not necessarily be traversed. For example, only even-numbered contactless guides 20 may be traversed, or only any one of contactless guides 20 may be traversed. The relationship between traverse distance and winding length will be described later with reference to FIG. 7.

In a state where the traverse of contactless guide 20 is completed, bare optical fiber 10 introduced into uppermost contactless guide 21 closest to optical fiber preform 2 and bare optical fiber 10 discharged from lowermost contactless guide 29 closest to coating portion 5 extend along direction X. On the other hand, bare optical fiber 10 passing between contactless guides 20 extends in a direction inclined with respect to direction X. In the embodiment, the lengths of bare optical fibers 10 between contactless guides 20 are substantially the same. In a state where the traverse of contactless guide 20 is completed, an imaginary line extending downward from contactless guide 21 in the vertical direction and an imaginary line extending downward from contactless guide 29 in the vertical direction coincide with each other.

The traveling direction of bare optical fiber 10 is changed by a predetermined angle $\alpha$ by each contactless guide 20. Angle $\alpha$ of the traveling direction changed by contactless guide 20 is an angle formed by the traveling direction of bare optical fiber 10 when it is assumed that the traveling direction is not changed by contactless guide 20 and the traveling direction of bare optical fiber 10 whose traveling direction has been changed by contactless guide 20. That is, angle $\alpha$ changed by contactless guide 21 is an angle $\alpha$1 formed by the advancing direction of bare optical fiber 10 (the direction advancing downward along the straight line SL1 shown in FIG. 4) when the traveling direction is not changed by contactless guide 21 and the advancing direction of bare optical fiber 10 (the direction advancing rightward along the straight line SL2 shown in FIG. 4) when the traveling direction is changed by contactless guide 21. Using an angle $\theta$ described later, $\alpha1=\pi/2+\theta$. Angle $\alpha$ changed by contactless guide 22 is an angle $\alpha$2 formed by the advancing direction of bare optical fiber 10 (the advancing direction rightward along the straight line SL2 shown in FIG. 4) when the traveling direction is not changed by contactless guide 22 and the advancing direction of bare optical fiber 10 (the advancing direction leftward along the straight line SL3 shown in FIG. 4) when the traveling direction is changed by contactless guide 22. Using an angle $\theta$ described later, $\alpha2=2\theta$. Here, straight line SL3 is a straight line along bare optical fiber 10 which is discharged from contactless guide 22 and introduced into contactless guide 23.

In the embodiment, contactless guide 21 and contactless guide 29 change the traveling direction of bare optical fiber 10 by angle $\alpha$ slightly exceeding 90° (for example, an angle of 95° to 110°), and other contactless guides 22 to 28 change the traveling direction of bare optical fiber 10 by angle $\alpha$ (for example, an angle of 10° to 40°).

Figure 5:
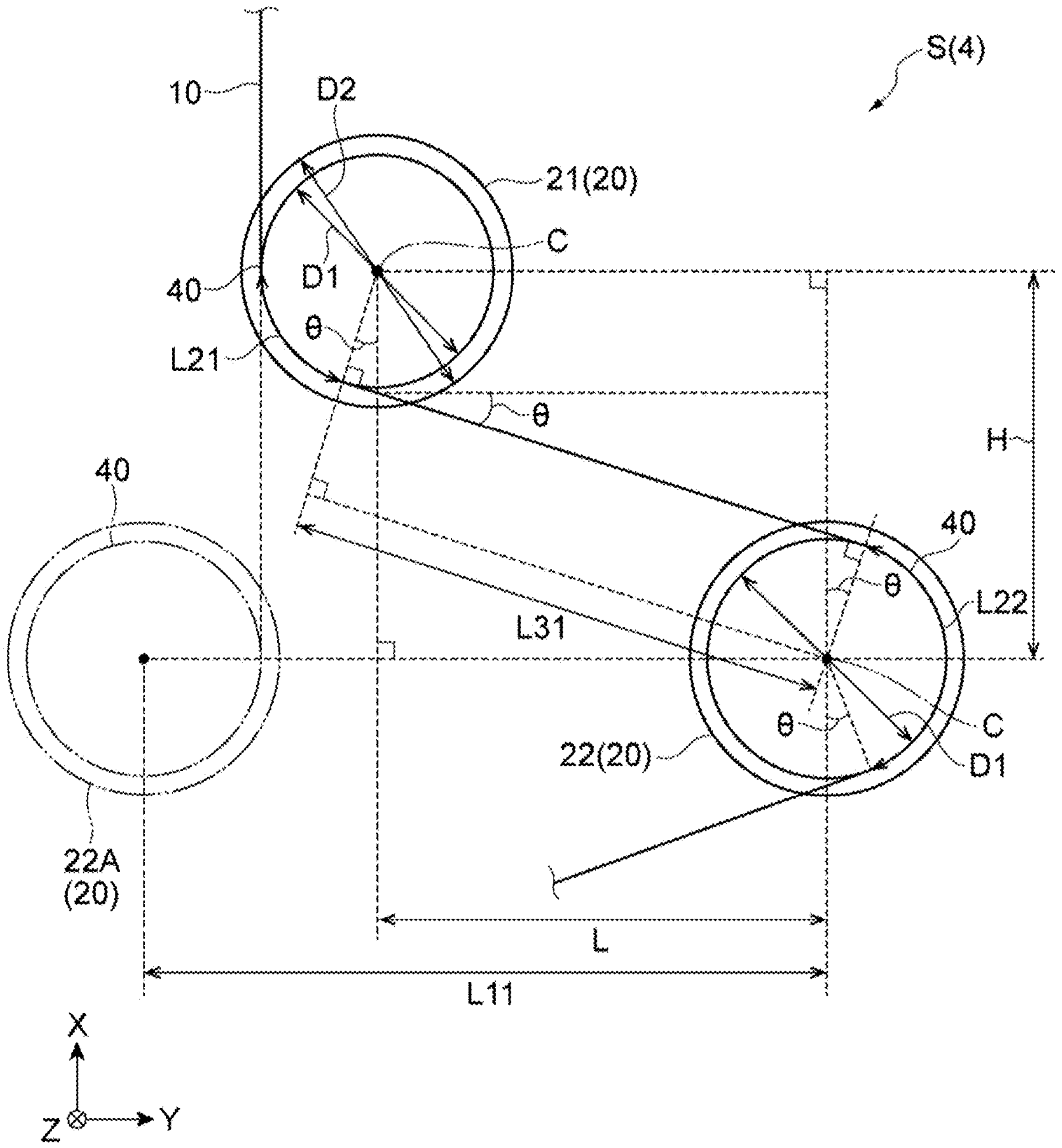
FIG. 5 is a view showing two contactless guides next to each other in a direction X among the plurality of contactless guides shown in FIG. 4.

FIG. 5 is a view showing two contactless guides 20 next to each other in direction X. In FIG. 5, contactless guide 21 and contactless guide 22 are shown as examples. In FIG. 5, for convenience of explanation, the width in direction Y between contactless guide 21 and contactless guide 22 is shown to be smaller than that in FIG. 4. In FIG. 5, contactless guides 21 and 22 in a state where the traverse is completed are indicated by solid lines. In addition, in FIG. 5, contactless guide 22 positioned at a point (hereinafter referred to as a reference point) at which bare optical fiber 10 passes through guide portion 40 without being curved when contactless guide 22 starts traversing and bare optical fiber 10 is extended so as to hang down along direction X is referred to as a contactless guide 22A and indicated by a two dot chain line.

Here, the distance between points shown in FIG. 5 will be described. Pitch width H shown in FIG. 5 is the distance in direction X between the center axes C of adjacent contactless guides 20. Pitch width H may be adjustable by changing the position of each contactless guide 20 in direction X. Further, a horizontal distance L is a distance in direction Y between the center axes C of adjacent contactless guides 20. Horizontal distance L may be, for example, 50 mm to 450 mm. Horizontal distance L may be adjustable by changing the position of each contactless guide 20 in direction Y (by traversing each contactless guide 20).

A winding diameter D1 is a diameter of a circle formed by bare optical fiber 10 when bare optical fiber 10 is wound around the entire circumference of guide portion 40 in each contactless guide 20. Winding diameter D1 may be, for example, 50 mm to 200 mm. Outer diameter D2 is the diameter of the flange portion of each contactless guide 20 (the diameter of the outer edge of contactless guide 20 when viewed in direction Z). Outer diameter D2 may be, for example, 80 mm to 230 mm. The plurality of contactless guides 20 is arranged at regular intervals such that pitch width H between the plurality of contactless guides 20 is larger than outer diameter D2 of each of the plurality of contactless guides 20. Pitch width H may be, for example, 150 mm to 200 mm. A traverse distance L11 is a distance in direction Y between center axis C of contactless guide 20 (contactless guide 22A shown in FIG. 5) positioned at the reference point and center axis C of contactless guide 20 (for example, contactless guide 22 shown in FIG. 5) after traversing. Traverse distance L11 may be larger than 0 mm and may be, for example, 100 mm to 500 mm, 200 mm to 400 mm, or may be approximately 350 mm.

Bare optical fiber 10 inserted into internal space S passes through guide portion 40 of contactless guide 21 after moved along direction X. Thereafter, bare optical fiber 10 moves along guide portion 40 so as to be wound around contactless guide 21, is discharged from guide portion 40, and is sent to contactless guide 22. Bare optical fiber 10 between contactless guide 21 and contactless guide 22 extends in a direction that intersects direction X at an angle θ. Bare optical fiber 10 sent to contactless guide 22 passes through guide portion 40 of contactless guide 22. Thereafter, bare optical fiber 10 moves along guide portion 40 so as to be wound around contactless guide 22, and is discharged from guide portion 40 to be sent to contactless guide 23 (refer to FIG. 4). In this case, horizontal distance L may be obtained by Equation 1 below.

$$L = (H - D1/\cos\theta)/\tan\theta \tag{1}$$

Next, the winding length and the aerial length of bare optical fiber 10 will be described. As described above, the winding length of bare optical fiber 10 is a length of a portion (hereinafter, referred to as a wound portion) of bare optical fiber 10 passed through guide portion 40, which is positioned on a circle arc centered on center axis C of contactless guide 20. A winding length L21 of bare optical fiber 10 with respect to contactless guide 21 is obtained by the following Equation (2).

$$L21 = D1\,(\pi - 2\theta)/4 \tag{2}$$

In addition, the winding length of bare optical fiber 10 with respect to contactless guide 29 (refer to FIG. 4) can also be calculated using an equation similar to the Equation (2).

A winding length L22 of bare optical fiber 10 with respect to contactless guide 22 is obtained by the following Equation (3).

$$L22 = D1\,(\pi - 2\theta)/2 \tag{3}$$

In addition, the winding length of bare optical fiber 10 with respect to contactless guides 23 to 28 (refer to FIG. 4) can also be calculated using an equation similar to the Equation (3).

The aerial length of bare optical fiber 10 is the length of a portion of bare optical fiber 10 that connects the wound portions. An aerial length L31 of bare optical fiber 10 between contactless guide 21 and contactless guide 22 is obtained by the following Equation (4).

$$L31 = D1\tan\theta + L/\cos\theta \tag{4}$$

In addition, the aerial length of bare optical fiber 10 between other contactless guides 20 can also be calculated using an equation similar to Equation (4).

Figure 6:
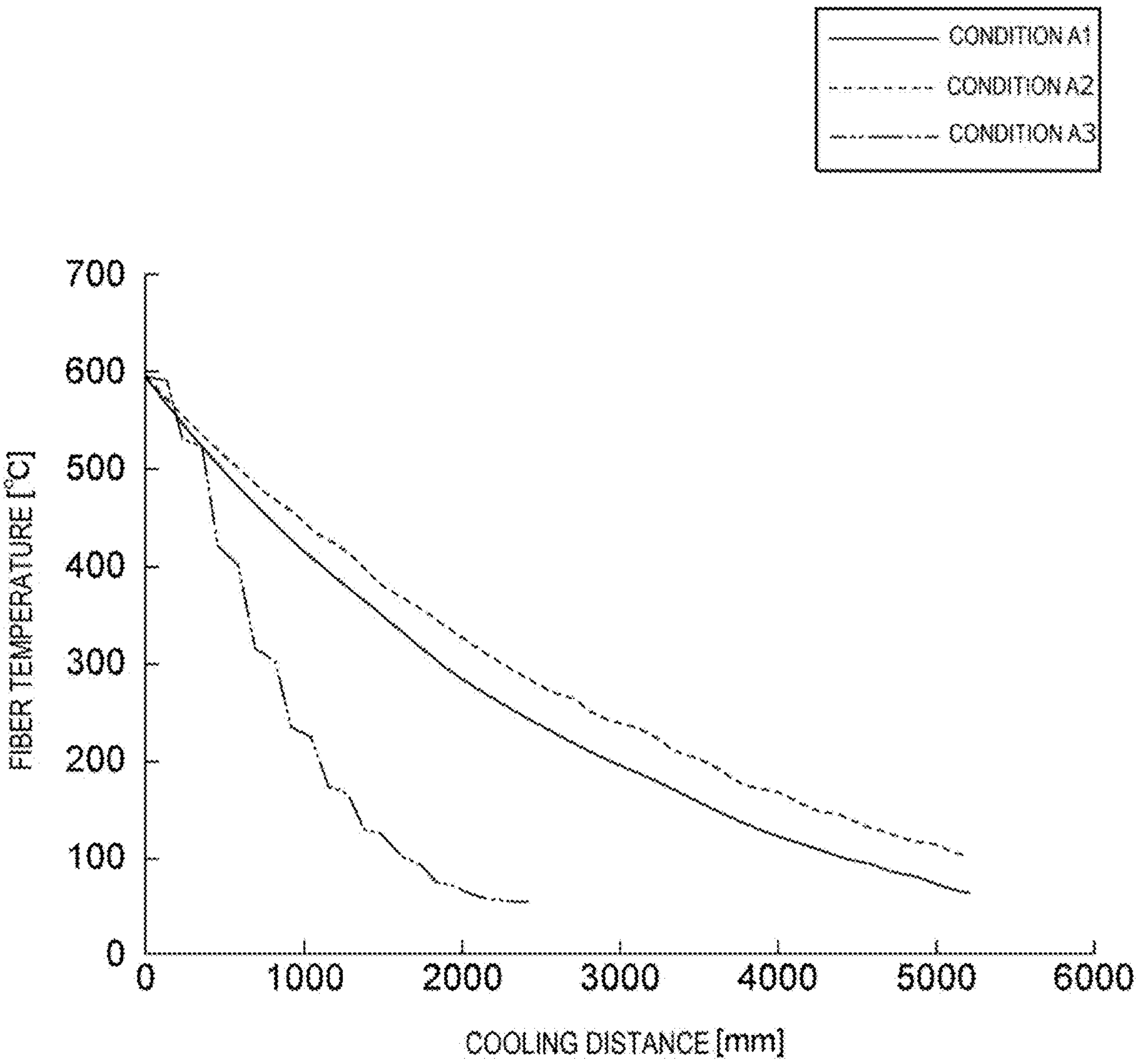
FIG. 6 is a graph showing the relationship between the cooling distance and the fiber temperature.

FIG. 6 is a graph showing the calculated relationship between cooling distance and fiber temperature. In FIG. 6, the horizontal axis represents the cooling distance (unit: mm) and the vertical axis represents the fiber temperature (unit: °C.). Here, the cooling distance is a distance by which bare optical fiber 10 moves in internal space S (refer to FIG. 1) of cooling portion 4. The cooling distance is calculated by appropriately using the above-described equations. The fiber temperature is the temperature of bare optical fiber 10. Each line shown in FIG. 6 indicates the fiber temperature when bare optical fiber 10 is cooled under each different condition from condition A1 to condition A3. In the measurement of condition A1 and condition A2, bare optical fiber 10 was moved in a straight line along direction X in internal space S without using contactless guide 20. In addition, in the measurement of the condition A1, the linear velocity of bare optical fiber 10 was set to Y1 m/min of the conventional condition, and in the measurement of the condition A2, the linear velocity of bare optical fiber 10 was set to 1.2×Y1 m/min.

On the other hand, in the measurement under condition A3, bare optical fiber 10 was moved while changing its traveling direction using contactless guide 20. In the measurement of condition A3, eight contactless guides 20 were used, horizontal distance L (refer to FIG. 5) between contactless guides 20 was set to 500 mm, and the linear velocity of bare optical fiber 10 was set to 1.2×Y1 m/min. In all of the conditions A1 to A3, it is assumed that the temperature of bare optical fiber 10 is about 600 °C when bare optical fiber 10 enters internal space S.

As shown in FIG. 6, in the measurement under the condition A3, the fiber temperature decreases to about 100 °C at a shorter cooling distance than in the measurement under the condition A1 and the condition A2. By cooling bare optical fiber 10 to about 100 °C, the resin coating can be appropriately provided on the outer periphery of bare optical fiber 10.

In addition, in the measurements under condition A1 and condition A2, the fiber temperature gradually decreases. On the other hand, in the measurement under the condition A3, a portion where the fiber temperature gradually decreases and a portion where the fiber temperature rapidly decreases are alternately repeated. The portion where the fiber temperature rapidly decreases corresponds to a portion of bare optical fiber 10 that is wound around contactless guide 20. According to the findings of the present inventors, it is considered that the fiber temperature is rapidly lowered by the gas blown from guide portion 40 when bare optical fiber 10 is wound around contactless guide 20. That is, by increasing or decreasing the winding length of bare optical fiber 10 with respect to contactless guides 20 compared to the aerial length between contactless guides 20, it is possible to adjust the cooling efficiency of bare optical fiber 10 more largely.

Figure 7:
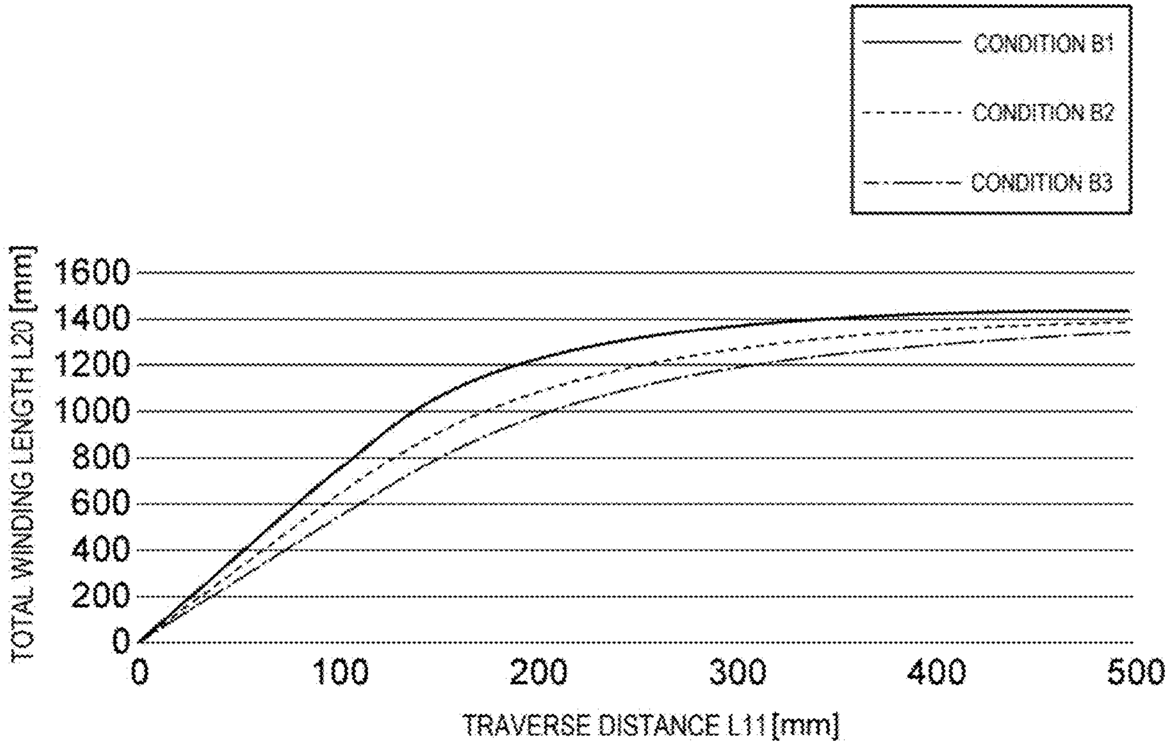
FIG. 7 is a graph showing the relationship between the traverse distance and the total winding length.

FIG. 7 is a graph showing the relationship between traverse distance L11 and a total winding length L20. In FIG. 7, the horizontal axis represents traverse distance L11 (unit: mm) of even-numbered contactless guide 20, and the vertical axis represents total winding length L20 (unit: mm) of bare optical fiber 10. The graph of FIG. 7 shows changes in total winding length L20 when traverse distance L11 of even-numbered contactless guide 20 is changed under each of conditions B1 to B3. Pitch width H between contactless guides 20 was 150 mm in condition B1, 170 mm in condition B2, and 190 mm in condition B3. In addition, in common in each condition, it is an example in the cases when the number of contactless guides 20 included in cooling portion 4 is nine, and winding diameter D1 of each contactless guide 20 is 120 mm.

As shown in FIG. 7, in all of conditions B1 to B3, as traverse distance L11 of even-numbered contactless guide 20 is increased, total winding length L20 is increased. However, the increase amount of total winding length L20 with respect to the increase amount of traverse distance L11 gradually decreases as traverse distance L11 increases. It can be seen that when traverse distance L11 exceeds about 300 mm, total winding length L20 does not substantially change and remains constant even when traverse distance L11 is increased. When total winding length L20 is calculated by setting the number of contactless guides 20 included in cooling portion 4 to five or seven, the same tendency is obtained.

Figure 8:
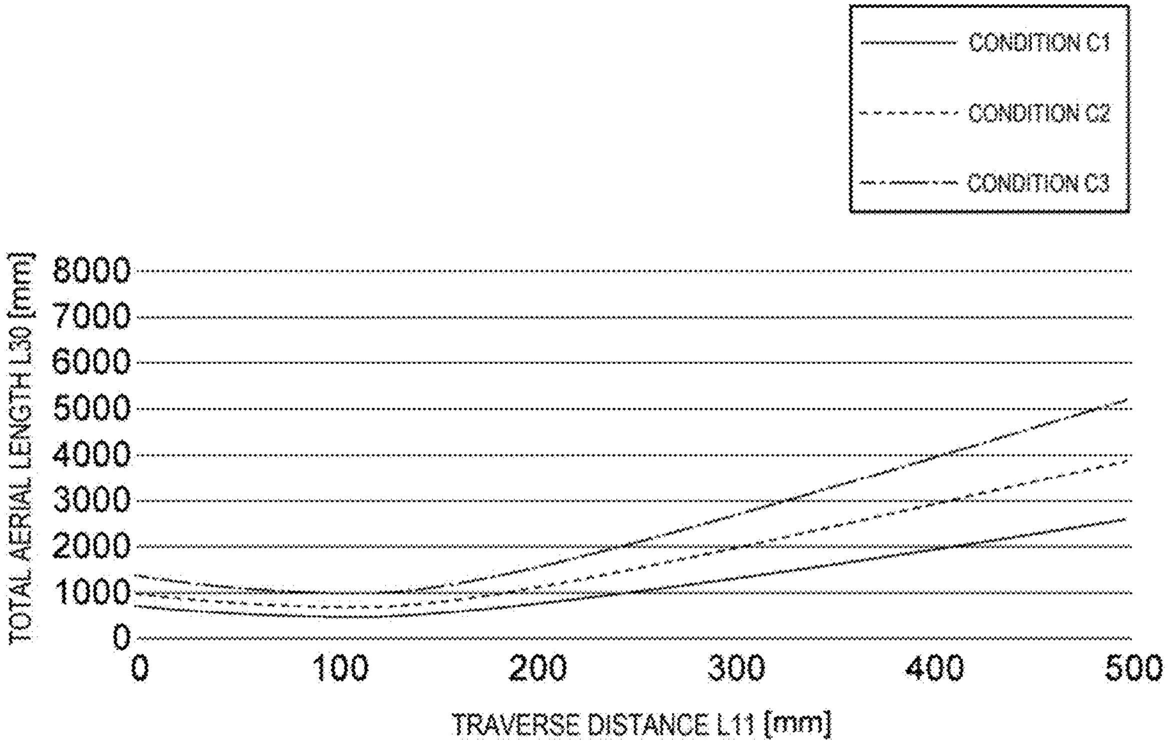
FIG. 8 is a graph showing the relationship between the traverse distance and the total aerial length.

FIG. 8 is a graph showing the relationship between traverse distance L11 and a total aerial length L30. In FIG. 8, the horizontal axis represents traverse distance L11 (unit: mm) of even-numbered contactless guide 20, and the vertical axis represents total aerial length L30 (unit: mm). Here, the total aerial length is a total value of aerial lengths between contactless guides 20. The graph of FIG. 8 shows changes in total aerial length L30 when traverse distance L11 of even-numbered contactless guide 20 is changed under each of conditions C1 to C3. The number of contactless guides 20 included in cooling portion 4 was five in condition C1, seven in condition C2, and nine in condition C3. In addition, in common in each condition, pitch width H is 170 mm, and winding diameter D1 of each contactless guide 20 is 120 mm.

As shown in FIG. 8, in all of conditions C1 to C3, total aerial length L30 increases as traverse distance L11 of even-numbered contactless guide 20 increases. In contrast to FIG. 7, unlike the above-described total winding length L20, the increase amount of total aerial length L30 does not decrease even when traverse distance L11 exceeds 300 mm. When pitch width H of contactless guide 20 is set to 150 mm and 190 mm, total aerial length L30 has the same tendency.

Figure 9:
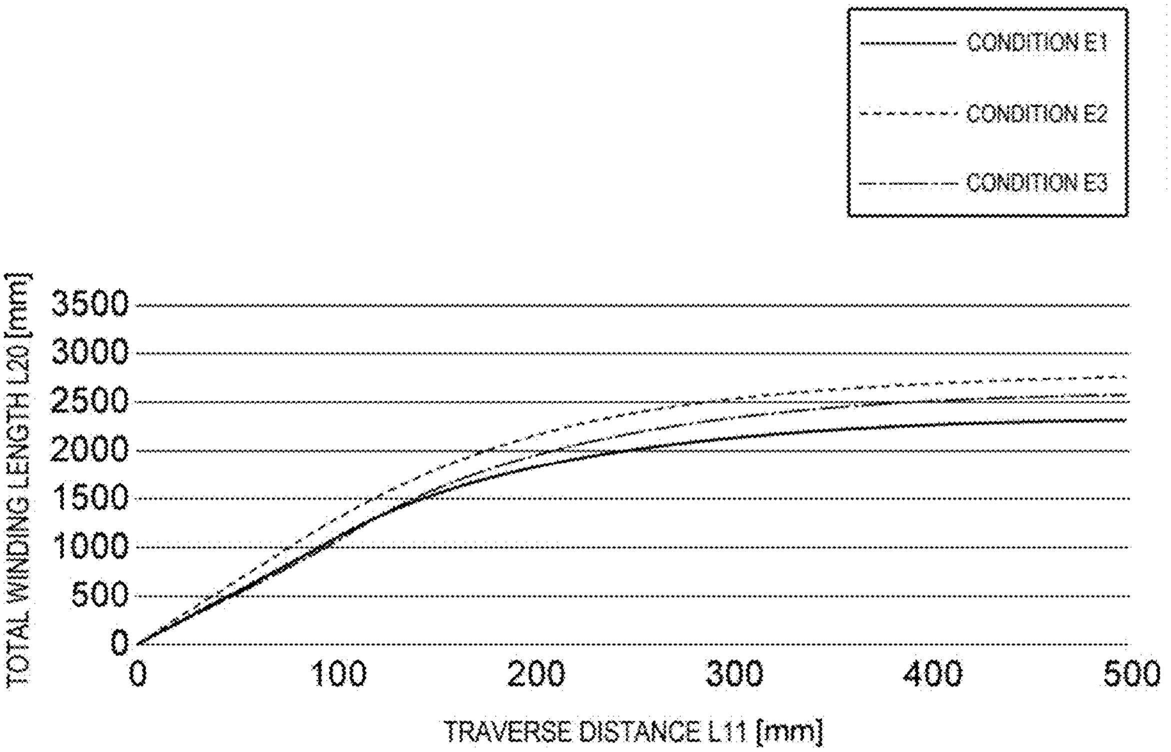
FIG. 9 is a graph showing the relationship between the traverse distance and the total winding length.

FIG. 9 is a graph showing the relationship between traverse distance L11 and total winding length L20. In FIG. 9, the horizontal axis represents traverse distance L11 (unit: mm) of even-numbered contactless guide 20, and the vertical axis represents total winding length L20 (unit: mm). The graph of FIG. 9 shows changes in total winding length L20 when traverse distance L11 of even-numbered contactless guide 20 is changed under each of conditions E1 to E3.

In condition E1, the number of contactless guides 20 included in cooling portion 4 was nine, winding diameter D1 was 100 mm, and pitch width H was 150 mm. In condition E2, the number of contactless guides 20 included in cooling portion 4 was nine, winding diameter D1 was 120 mm, and pitch width H was 170 mm. In condition E3, the number of contactless guides 20 included in cooling portion 4 was 7, winding diameter D1 was 150 mm, and pitch width H was 190 mm. In addition, the total height T (refer to FIG. 4) from the upper end of contactless guide 20 positioned at the top of cooling portion 4 to the lower end of contactless guide 20 positioned at the bottom was 1300 mm under condition E1, 1480 mm under condition E2, and 1350 mm under condition E3.

As shown in FIG. 9, total winding length L20 in condition E3 in which the number of contactless guides 20 is seven is larger than total winding length L20 in condition E1 in which the number of contactless guides 20 is nine. That is, even when the number of contactless guides 20 is reduced, total winding length L20 can be increased by adjusting winding diameter D1 and pitch width H. In addition, although the total height T (accordingly, the height of the equipment of the cooling portion) under condition E3 is the same or approximately the same as that of condition E1, total winding length L20 under condition E3 can be larger than that under condition E1.

In addition, total winding length L20 under condition E2 in which winding diameter D1 is 120 mm is larger than total winding length L20 under condition E3 in which winding diameter D1 is 150 mm. That is, even when winding diameter D1 is reduced, total winding length L20 can be increased by adjusting the number of contactless guides 20 and pitch width H.

As described above, it is possible to increase or decrease the winding length of bare optical fiber 10 by appropriately changing the number of contactless guides 20, winding diameter D1, pitch width H, traverse distance L11, and the like. The operation of increasing or decreasing the winding length may be performed in the cooling process of bare optical fiber 10 in the manufacturing process of the optical fiber. In addition, total winding length L20 of bare optical fiber 10 may be adjusted to be maximized in consideration of an arrangement space of manufacturing apparatus 1, a weight of each contactless guide 20, and the like.

As described above, according to the method of manufacturing an optical fiber according to the embodiment, the winding length of bare optical fiber 10 may be increased or decreased by adjusting the positions of the plurality of contactless guides 20. The increase or decrease in the winding length of bare optical fiber 10 has a greater influence on the cooling efficiency than the increase or decrease in the aerial length of bare optical fiber 10 between contactless guides 20. Therefore, according to the manufacturing method described above, the cooling efficiency of bare optical fiber 10 can be adjusted in a wider range, and the capacity of cooling of bare optical fiber 10 can be appropriately controlled.

<First Modification>

Figure 10:
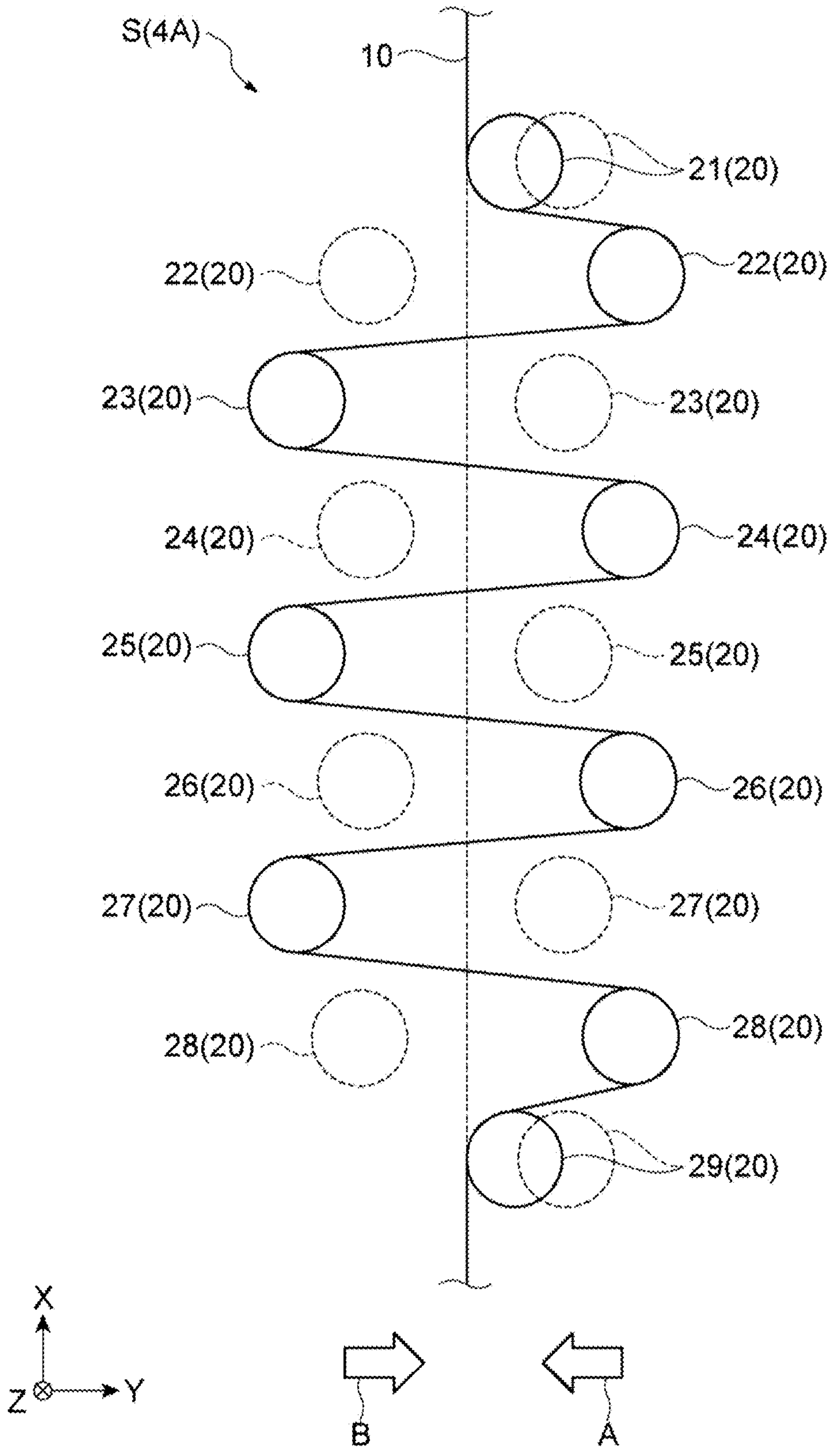
FIG. 10 is a view showing a state in which a bare optical fiber is wound around a contactless guide in the internal space of the optical fiber manufacturing apparatus according to a first modification.

The optical fiber manufacturing apparatus 1 and the first modification of the manufacturing method will be described with reference to FIG. 10. FIG. 10 is a view showing a state in which bare optical fiber 10 is wound around contactless guide 20 in internal space S of the optical fiber manufacturing apparatus according to the first modification. In the following description, differences from the above-described embodiment will be mainly described, and description of common points may be omitted. In FIG. 10, bare optical fiber 10 and contactless guide 20 in a state before winding bare optical fiber 10 around contactless guide 20 are indicated by dashed lines, and bare optical fiber 10 and contactless guide 20 in a state after winding are indicated by solid lines.

In the embodiment described above, as shown in FIG. 4, even-numbered contactless guides 20 are traversed more largely than the odd numbered contactless guides 20 in cooling portion 4. On the other hand, this modification is different from the above-described embodiment in that a portion of odd-numbered contactless guides 20 is traversed by the same distance as even-numbered contactless guides 20 in a cooling portion 4A.

In a state before bare optical fiber 10 is wound around contactless guide 20, bare optical fiber 10 is disposed so as to extend along direction X as in the above-described embodiment. Bare optical fiber 10 is disposed so as to be sandwiched between odd-numbered contactless guides 20 and even-numbered contactless guides 20 in direction Y. The plurality of contactless guides 20 is arranged such that contactless guides 20 adjacent to each other in the traveling direction of bare optical fiber 10 are spaced apart from each other in direction X. That is, odd-numbered contactless guides 20 and even-numbered contactless guides 20 are alternately arranged so that their positions in direction X do not overlap with each other.

In this state, odd-numbered contactless guides 20 and even-numbered contactless guides 20 are traversed in different directions toward bare optical fiber 10. Specifically, odd-numbered contactless guide 20 is traversed in arrow A direction shown in FIG. 10, and even-numbered contactless guide 20 is traversed in arrow B direction shown in FIG. 10.

Among odd-numbered contactless guides 20, uppermost contactless guide 21 (first contactless guide) closest to optical fiber preform 2 and lowermost contactless guide 29 (second contactless guide) closest to coating portion 5 are traversed to a position such that their outer edges approximately overlap with bare optical fiber 10 extending in direction X (until bare optical fiber 10 passes through guide portion 40). Odd-numbered contactless guides 20 other than contactless guides 21 and 29 (contactless guides 23, 25 and 27) traverse substantially the same distance as even-numbered contactless guides 20. By appropriately adjusting the traverse distance of each contactless guide 20, the winding length of bare optical fiber 10 can be increased or decreased to control the capacity of cooling of bare optical fiber 10.

In the method of manufacturing an optical fiber according to this modification, the plurality of contactless guides 20 is four or more contactless guides 20. Among the plurality of contactless guides 20, contactless guides 20 other than contactless guide 21 closest to optical fiber preform 2 and contactless guide 29 closest to a device (coating portion 5) configured to perform coating with the resin (contactless guides 21 to 28) are moving contactless guides. Contactless guides 23, 25, and 27 positioned at odd-numbered positions from optical fiber preform 2 and contactless guides 22, 24, 26, and 28 positioned at even-numbered positions from optical fiber preform 2 are traversed in directions different from each other in the horizontal direction (direction Y) by substantially the same distance to increase or decrease the winding length. In this case, the lengths of bare optical fiber 10 between contactless guides 20 other than contactless guides 21 and 29 are substantially the same, and total winding length L20 of bare optical fiber 10 can be easily calculated. Therefore, it is easy to appropriately control the capacity of cooling of bare optical fiber 10.

<Second Modification>

Figure 11:
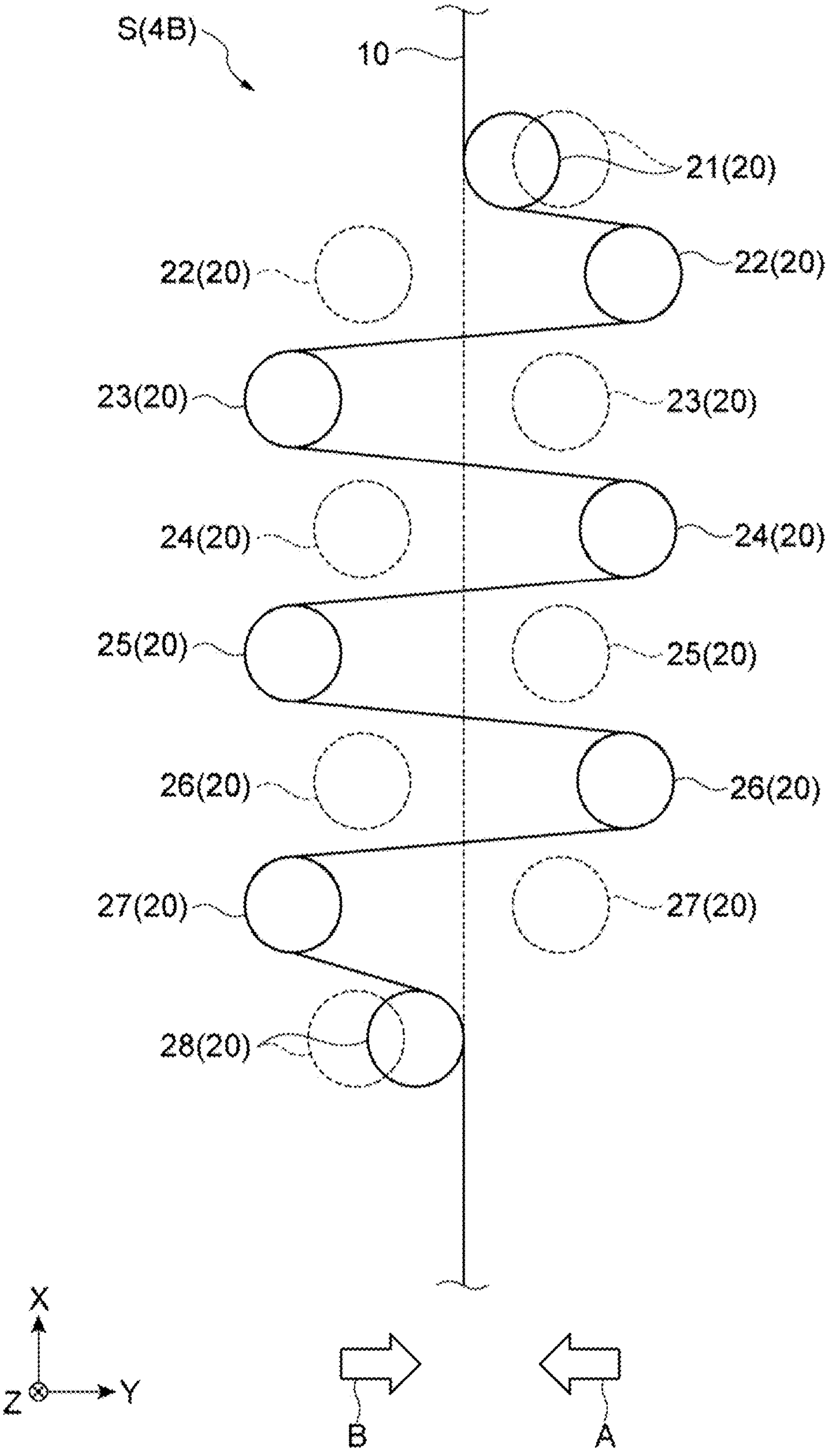
FIG. 11 is a view showing a state in which a bare optical fiber is wound around a contactless guide in the internal space of the optical fiber manufacturing apparatus according to a second modification.

The second modification of the optical fiber manufacturing apparatus 1 and the manufacturing method will be described with reference to FIG. 11. FIG. 11 is a view showing a state in which bare optical fiber 10 is wound around contactless guide 20 in internal space S of the optical fiber manufacturing apparatus according to the second modification. In the following description, differences from the above-described embodiment will be mainly described, and description of common points may be omitted. In FIG. 11, bare optical fiber 10 and contactless guide 20 in a state before winding bare optical fiber 10 around contactless guide 20 are indicated by dashed lines, and bare optical fiber 10 and contactless guide 20 in a state after winding are indicated by solid lines.

As shown in FIG. 4, cooling portion 4 according to the above-described embodiment has an odd number (nine) of contactless guides 20. On the other hand, as shown in FIG. 11, a cooling portion 4B according to this modification is different from the above-described embodiment in that an even number (eight) of contactless guides 20 are provided.

In a state before bare optical fiber 10 is wound around contactless guide 20, bare optical fiber 10 is disposed so as to extend along direction X as in the above-described embodiment. Bare optical fiber 10 is disposed so as to be sandwiched between odd-numbered contactless guide 20 and even-numbered contactless guide 20 in direction Y. The plurality of contactless guides 20 is arranged such that contactless guides 20 adjacent to each other in the traveling direction of bare optical fiber 10 are spaced apart from each other in direction X. That is, odd-numbered contactless guides 20 and even-numbered contactless guides 20 are alternately arranged so that their positions in direction X do not overlap with each other.

In this state, odd-numbered contactless guides 20 and even-numbered contactless guides 20 are traversed in different directions toward bare optical fiber 10. Specifically, odd-numbered contactless guide 20 is traversed in arrow A direction shown in FIG. 11, and an even-numbered contactless guide 20 is traversed in arrow B direction shown in FIG. 11.

Among odd-numbered contactless guides 20, uppermost contactless guide 21 closest to optical fiber preform 2 and lowermost contactless guide 28 closest to coating portion 5 are traversed to a position such that their outer edges approximately overlap with bare optical fiber 10 extending in direction X (until bare optical fiber 10 passes through guide portion 40). Odd-numbered contactless guides 20 other than contactless guide 21 (contactless guides 23, 25 and 27) traverse approximately the same distance as even-numbered contactless guides 20 other than contactless guide 28 (contactless guides 22, 24 and 26). By appropriately adjusting the traverse distance of each contactless guide 20, the winding length of bare optical fiber 10 can be increased or decreased to control the capacity of cooling of bare optical fiber 10.

In the method of manufacturing an optical fiber according to this modification, the plurality of contactless guides 20 is four or more contactless guides 20. Among the plurality of contactless guides 20, contactless guides 20 other than contactless guide 21 closest to optical fiber preform 2 and contactless guide 28 closest to a device (coating portion 5) configured to perform coating with the resin (contactless guides 21 to 27) are moving contactless guides. The winding length is increased or decreased by traversing contactless guides 20 positioned odd-numbered from optical fiber preform 2 (contactless guides 23, 25, and 27) and contactless guides 20 positioned even-numbered from optical fiber preform 2 (contactless guides 22, 24, and 26) in directions different from each other in the horizontal direction (direction Y) and by substantially the same distance. In this case, the lengths of bare optical fiber 10 between contactless guides 20 other than contactless guides 21 and 28 are substantially the same, and total winding length L20 of bare optical fiber 10 can be easily calculated. Therefore, it is easy to appropriately control the capacity of cooling of bare optical fiber 10.

<Third Modification>

Figure 12:
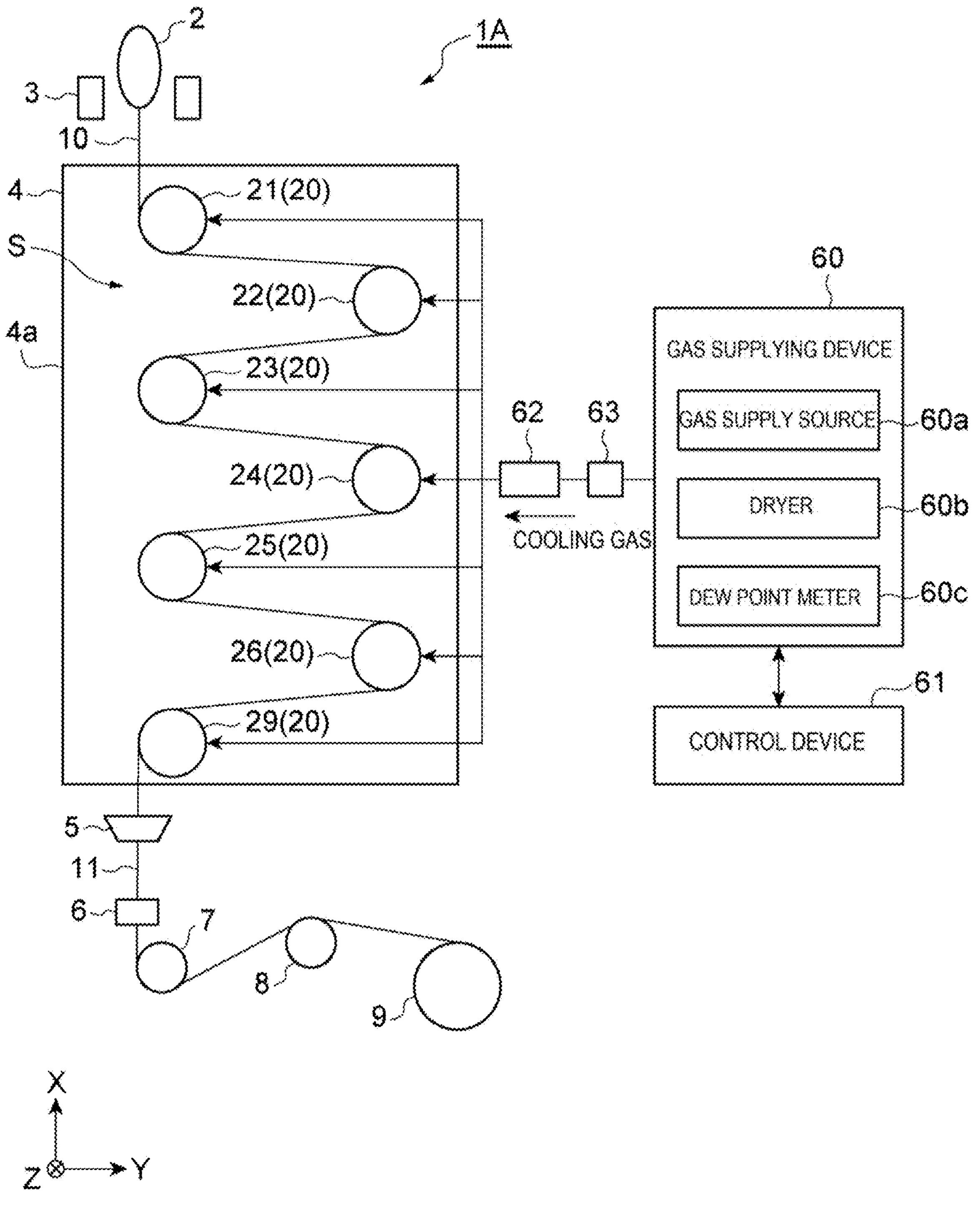
FIG. 12 is a schematic view of an optical fiber manufacturing apparatus according to a third modification.

The third modification of the optical fiber manufacturing apparatus 1 and the manufacturing method will be described with reference to FIG. 12. FIG. 12 is a schematic view of an optical fiber manufacturing apparatus according to the third modification. As shown in FIG. 12, a manufacturing apparatus 1A according to the third modification is an apparatus for manufacturing optical fiber 11 by heating and melting optical fiber preform 2 to draw bare optical fiber 10 and providing the coating resin on the outer periphery of bare optical fiber 10. Similar to manufacturing apparatus 1, manufacturing apparatus 1A includes drawing furnace 3, cooling portion 4, coating portion 5, hardening portion 6, the bottom roller 7, the pulling roller 8, and winding portion 9 sequentially along a path through which bare optical fiber 10 and optical fiber 11 pass. Manufacturing apparatus 1A further includes a gas supplying device 60, a control device 61, a filter 62, and an on-off valve 63. It is noted that, FIG. 12 shows an example in which cooling portion 4 has seven contactless guides 20, but the number of contactless guides 20 is not limited to this. Although traverse device 50 is not shown in FIG. 12, each contactless guide 20 according to the third modification is also configured to traverse in the Y direction as in the above-described embodiment.

Each contactless guide 20 also functions as a member for cooling bare optical fiber 10. That is, as shown in FIGS. 12 and 13, gas (dry air) supplied from gas supplying device 60 to the inner side of contactless guide 20 is blown out from a gap 80 toward the outside in the radial direction, gap 80 being guide portion 40 of contactless guide 20. The blown dry air is blown from the inside to bare optical fiber 10 passed through gap 80. Bare optical fiber 10 is cooled in a floating state by being directly blown with dry air. Bare optical fiber 10 cooled by such cooling portion 4 is sent to coating portion 5. It is noted that, the dry air is not limited to air but may be any gas. The dry air may be, for example, nitrogen.

Next, gas supplying device 60 and control device 61 for supplying a cooling gas (dry air) to cooling portion 4 (contactless guide 20) will be described. Gas supplying device 60 supplies cooling portion 4 with dry air whose dew point is controlled to be 0 °C or less under the control of control device 61. More specifically, gas supplying device 60 supplies dry air to each contactless guide 20 through filter 62 and on-off valve 63. In addition, another cooling gas may be supplied into a housing 4*a* of cooling portion 4 from another gas supplying device.

Filter 62 used for supplying the dry air is, for example, a gas filter for removing impurities in the dry air, and for example, a gas filter having a filtration accuracy (also referred to as "filtration degree") of 0.03 μm or less can be used. As filter 62, a gas filter having a filtration accuracy of 0.01 μm or less may be used. Since there are many foreign matters on the order of 0.01 μm in the dry air, by setting the filtration accuracy of filter 62 to 0.03 μm or less, it is possible to reduce the frequency of disconnection of bare optical fiber 10 due to collision of impurities or the like to about half. By setting the filtration accuracy of filter 62 to be used to 0.01 μm or less, the frequency of disconnection can be further reduced. Here, the term "filtration accuracy" as used herein means that the collection efficiency of particles having a corresponding size (for example, particles having a size of 0.01 μm or more when the filtration accuracy is 0.01 μm) is 99.99% or more. In addition, on-off valve 63 for adjusting the flow rate of dry air is, for example, a valve (adjustment valve) that does not have a metal sliding portion, and generation of dust (metal powder) due to sliding is suppressed. For example, an air-operated valve can be used as on-off valve 63. A solenoid valve may be used to control opening and closing of the air-operated valve. When the dust collection capacity of filter 62 disposed downstream is sufficient, on-off valve 63 may be a solenoid valve.

Gas supplying device 60 includes a gas supply source 60*a*, a dryer 60*b*, and a dew point meter 60*c*. Gas is supplied from gas supply source 60*a* at a predetermined pressure. The gas is, for example, air, but may also be nitrogen. Dryer 60*b* generates dry air by drying the gas supplied from gas supply source 60*a*. The content of water vapor contained in the dry air supplied from gas supply source 60*a* is reduced by the drying by dryer 60*b*, and thus the dew point of the dry air is lowered. More specifically, the dry air is dried by dryer 60*b* so that the dew point of the dry air to be 0 °C or less. The content of water vapor water vapor contained in the dry air may be reduced, for example, by evaporation or adsorption of water vapor. It is noted that, the dew point refers to the temperature at which condensation from water vapor to water begins when a gas containing water vapor is cooled. When the dew point is 0 °C or less, condensation of water vapor into water and solidification of water into ice begin when the gas containing water vapor is cooled to the dew point. The dry air used here may be dried by dryer 60*b* so that the dew point is −10 °C or less, or may be dried by dryer 60*b* so that the dew point is −20 °C or less.

Dew point meter 60*c* of gas supplying device 60 measures the dew point of the dry air dried by dryer 60*b*. The dry air is dried by dryer 60*b* until the dew point measured by dew point meter 60*c* becomes 0 °C or less, which is a preset dew point. That is, gas supplying device 60 manages the dew point of the dry air supplied to contactless guide 20 and the like of cooling portion 4 to be 0 °C or less under the control of control device 61. As described above, the dew point managed dry air is supplied to cooling portion 4 (contactless guide 20 or the like) via filter 62, and internal space S in cooling portion 4 is filled with the dew point managed dry air.

As described above, control device 61 is a device for controlling gas supplying device 60. Control device 61 is, for example, a computer, and includes a CPU, a storage medium such as a memory, an input/output interface, and the like. Control device 61 controls the flow rate of the gas supplied from gas supply source 60*a*, the drying of the gas by dryer 60*b*, and the like so that the dry air supplied from gas supplying device 60 becomes 0 °C or less which is a predetermined dew point measured by dew point meter 60*c*.

Next, the structure of contactless guide 20, which is an example of a contactless roller, will be described with reference to FIGS. 2 and 13. FIG. 2 is a perspective view showing a contactless guide 20. FIG. 13 is an enlarged view of the vicinity of gap 80 of FIG. 2.

Contactless guide 20 is a member that changes the moving direction of bare optical fiber 10 in a contactless state. Contactless guide 20 has a circular shape in a plan view. Contactless guide 20 has gap 80 between first flange 30 and second flange 35 as shown in FIGS. 2 and 13. Gap 80 is provided annularly along the outer periphery of contactless guide 20. Bare optical fiber 10 is passed through gap 80. The dry air introduced into contactless guide 20 is blown out from gap 80 toward the outer side in the radial direction. The blown dry air is blown to bare optical fiber 10 passed through gap 80. Bare optical fiber 10 floats by being blown with dry air and does not come into contact with first flange 30 and second flange 35. In addition, as described above, bare optical fiber 10 is cooled by being blown with the dry air. In contactless guide 20, second flange 35 is configured to be movable with respect to first flange 30, and the width of gap 80 between both flanges can be adjusted.

Figure 14:
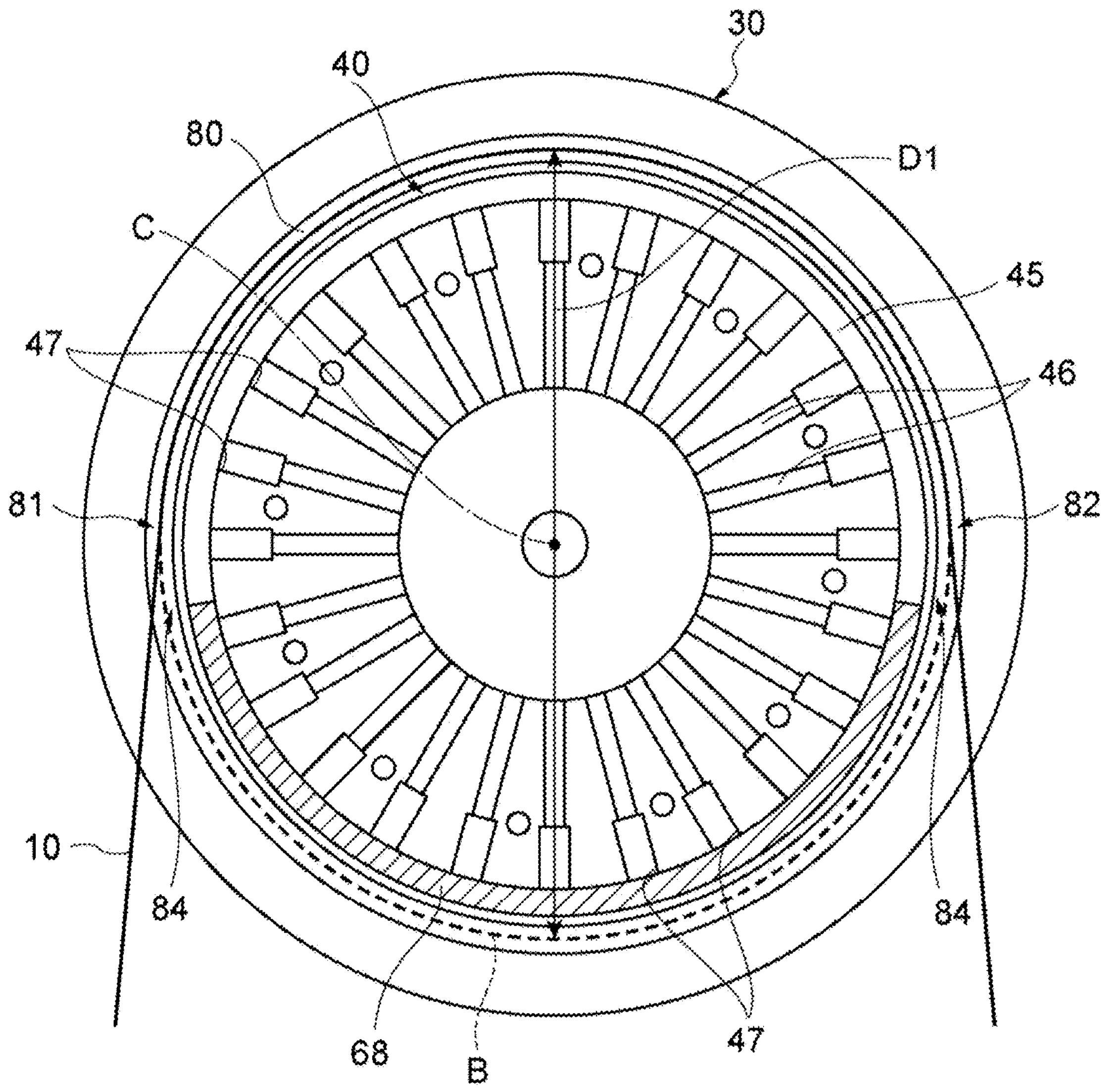
FIG. 14 is a cross-sectional view of a contactless guide.

Next, the configuration of contactless guide 20 when bare optical fiber 10 is passed through gap 80 will be described with reference to FIGS. 13 and 14. FIG. 14 is a cross-sectional view of contactless guide 20. First flange 30 and second flange 35 are attached to inner member 41 such that gap 80 is provided between the outer edge of first flange 30 and the outer edge of second flange 35, as shown in FIG. 13. In the embodiment, gap 80 is provided between an outer peripheral surface 32*a* of a peripheral wall portion 32 of first flange 30 and an outer peripheral surface 37*a* of a peripheral wall portion 37 of second flange 35.

As shown in FIG. 14, gap 80 is provided to surround center axis C along the circumferential direction of contactless guide 20. Bare optical fiber 10 is passed through gap 80. Specifically, bare optical fiber 10 enters gap 80 from a fiber insertion portion 81, moves along gap 80, and then exits to the outside from a fiber extraction portion 82. In the example shown in FIG. 14, bare optical fiber 10 moves an area of approximately one half of gap 80. That is, the moving direction of bare optical fiber 10 is changed by about 180° by contactless guide 20. The positions of fiber insertion portion 81 and fiber extraction portion 82 described above are determined by the amount of change in the moving direction of bare optical fiber 10. In the embodiment, the moving direction of bare optical fiber 10 is changed by about 180° as described above. Therefore, fiber extraction portion 82 is set at a position shifted from fiber insertion portion 81 by about a half the length of gap 80 in the circumferential direction. For example, when the moving direction of bare optical fiber 10 is changed by about 90°, fiber extraction portion 82 may be set at a position that is offset from fiber insertion portion 81 by about a quarter the length of gap 80 in the circumferential direction (at the top of gap 80 in FIG. 14).

As shown in FIGS. 13 and 14, gap 80 is spatially connected to a buffer groove 45 and an ejection port 47. Accordingly, the dry air ejected from ejection port 47 passes through buffer groove 45 and is blown out from gap 80 to the outside of contactless guide 20. The dry air blown out from gap 80 is blown to bare optical fiber 10 passed through gap 80. A state in which bare optical fiber 10 is floated from outer peripheral surface 32*a* of first flange 30 and outer peripheral surface 37*a* of second flange 35 is maintained by the wind pressure of the dry air. That is, bare optical fiber 10 is floated in gap 80.

The pressure of the dry air blown out from gap 80 (blow-out pressure) varies depending on factors such as the pressure of the dry air supplied to the gas flow path (not shown) in contactless guide 20 (inlet pressure) and the width W of gap 80, and is also affected by factors such as winding diameter D1 of contactless guide 20. Here, winding diameter D1 refers to a diameter of a circle (a circle B indicated by a solid line and a dashed line in FIG. 14) formed by bare optical fiber 10 when bare optical fiber 10 is passed through the entire circumference of gap 80. The blowout pressure is optimized by adjusting each of the above-described elements according to the tension of bare optical fiber 10, the diameter of bare optical fiber 10, or the like.

In general, in the process of increasing the linear velocity (moving speed) of bare optical fiber 10, the tension applied to bare optical fiber 10 is small, and when the pressure of the blown dry air is large, bare optical fiber 10 resonates and comes into contact with contactless guide 20. Therefore, the blow-out pressure is reduced in the process of increasing the linear velocity of bare optical fiber 10. On the other hand, in a state where the linear velocity is stable, the tension of bare optical fiber 10 is kept high, so that the blow-out pressure is increased. As a method of increasing the blowout pressure, for example, a method of increasing the inlet pressure or decreasing the width W of gap 80 can be adopted.

For example, when bare optical fiber 10 having a diameter of 125 μm is to be floated, the inlet pressure may be set to 50 kPa to 200 kPa, and the width W of gap 80 may be set to about 0.2 mm. At this time, the flow rate of the air blown out from gap 80 of one contactless guide 20 may be 30 L/min to 150 L/min.

In order to adjust the blow-out pressure to an appropriate level, first, the width W of gap 80 is reduced until the inlet pressure reaches a predetermined value (for example, 200 kPa) in a state in which dry air flows at a constant flow rate. At this time, for example, the width W of gap 80 may be reduced by bringing second flange 35 closer to first flange 30. Thereafter, the width W of gap 80 is gradually increased until the blow-out pressure reaches an optimum level (a level at which bare optical fiber 10 is appropriately floated). At this time, the width W of gap 80 may be increased by separating second flange 35 from first flange 30, for example. This adjustment operation of the blowing pressure may be performed for each contactless guide 20 shown in FIG. 13. Further, the adjustment operation may be performed at any timing in the manufacturing process of optical fiber 11.

Contactless guide 20 includes a sealing member 68 as shown in FIG. 14. For convenience of explanation, sealing member 68 is not shown in the drawings other than FIG. 14. Sealing member 68 seals at least one of the plurality of ejection ports 47 and prevents dry air from passing through ejection port 47. Sealing member 68 may be made of an elastic material such as resin. Sealing member 68 has an elongated shape and is fitted into the region of the portion of buffer groove 45 to block ejection port 47. In the embodiment, approximately half of buffer groove 45 is fitted with sealing member 68. The dry air does not flow into the portion of an air passage 46 where ejection port 47 is sealed by sealing member 68, and the dry air flows into the other portion of air passage 46 where ejection port 47 is not sealed.

Most of sealing member 68 does not overlap bare optical fiber 10 passing through gap 80 in a direction from center axis C to the outer circumference of contactless guide 20 (a radial direction of contactless guide 20). In the example shown in FIG. 14, a portion of sealing member 68 other than both end portions is provided so as not to overlap the circumferential position of bare optical fiber 10 passed through gap 80. In addition, a pair of air-escaping portions 84 through which the dry air in buffer groove 45 flows out is provided between both ends of sealing member 68 and bare optical fiber 10. Since the dry air accumulated in buffer groove 45 flows out smoothly from air-escaping portion 84, the dry air of an excessively high pressure is not blown out from gap 80, and bare optical fiber 10 can be floated in a stable state. The shape of sealing member 68 is not limited to that described above. In the embodiment, the plurality of ejection ports 47 is sealed by one continuous sealing member 68, but the plurality of ejection ports 47 may be sealed by, for example, a plurality of separate sealing members 68.

Here, a method of manufacturing an optical fiber using the optical fiber manufacturing apparatus 1A described above will now be described with reference to FIG. 12. First, optical fiber preform 2 is melted using drawing furnace 3, and drawing is started by winding melted optical fiber 11 by winding portion 9. At this time, bare optical fiber 10 to be drawn is arranged so that the traveling direction is changed in each contactless guide 20.

Subsequently, while the traveling direction of bare optical fiber 10 drawn from optical fiber preform 2 is changed by each contactless guide 20, bare optical fiber 10 is cooled by dry air ejected from the inner side of each contactless guide 20 toward bare optical fiber 10. As described above, the dry air is dry air whose dew point is controlled to 0 °C or less by gas supplying device 60 and control device 61. The dry air whose dew point is adjusted is supplied from gas supplying device 60 to each contactless guide 20 via on-off valve 63 and filter 62.

Subsequently, the sufficiently cooled bare optical fiber 10 comes out of cooling portion 4 and is coated with a predetermined resin in coating portion 5. After that, the coating resin is hardened in hardening portion 6, and optical fiber 11 is wound by winding portion 9.

As described above, according to the optical fiber manufacturing method and manufacturing apparatus of this modification, in addition to the above-described various operational effects, dry air is ejected toward bare optical fiber 10 from the inner side of contactless guide 20 that changes the traveling direction of bare optical fiber 10 in a contactless manner. In this case, since the dry air is directly blown to bare optical fiber 10 in the region close to bare optical fiber 10, bare optical fiber 10 can be efficiently cooled. In addition, contactless guide 20 for changing the direction without touching bare optical fiber 10 by ejecting the dry air has a portion (for example, gap 80) for receiving and guiding bare optical fiber 10, and when the traveling direction of bare optical fiber 10 is changed, the ejected dry air is rapidly released from narrow gap 80 to a wide region along the entire portion of contactless guide 20. At this time, there is a concern that a local temperature drop occurs due to the influence of adiabatic expansion, condensation of dry air occurs, and the condensation comes into contact with bare optical fiber 10 to cause disconnection. However, in the manufacturing method according to the above embodiment, since the dew point of the dry air is controlled to be 0 °C or less, the occurrence of such condensation is prevented. Therefore, according to this manufacturing method, the bare optical fiber 10 can be efficiently cooled by contactless guide 20 or the like without causing disconnection of the bare optical fiber 10 due to dew condensation.

Although embodiments and various modifications according to the present disclosure have been described in detail above, the present invention is not limited to the above-described embodiments and the like, and can be applied to various embodiments and modifications.

For example, in the above-described embodiment and the like, the traverse distance of each contactless guide 20 may be different from each other. In addition, winding diameter D1 and outer diameter D2 of each contactless guide 20 may be different from each other. Each contactless guide 20 may be movable not only in direction Y but also in directions X and Z or in a direction intersecting these directions.

In addition, the manufacturing apparatus and the manufacturing method according to the third modification have been described as a case of cooling portion 4 in which contactless guide 20 traverses in the Y direction to increase or decrease the winding length of bare optical fiber 10, but may be applied to a case in which contactless guide 20 does not traverse. That is, gas supplying device 60, control device 61, filter 62, and on-off valve 63 may be provided in the optical fiber manufacturing apparatus including cooling portion 4 in which contactless guide 20 does not traverse. Also in this case, the same effect can be obtained. As such an aspect, the following is added.

[Appendix 1]

A method of manufacturing an optical fiber, the method including:

- melting an optical fiber preform and drawing a bare optical fiber;
- cooling the bare optical fiber while changing a traveling direction of the bare optical fiber by at least one contactless guide; and
- forming an optical fiber by coating the bare optical fiber with a resin,
- in which, in the cooling, a gas is ejected from an inner side of the contactless guide toward the bare optical fiber, and the gas is dry air managed to have a dew point of 0 °C or less.

[Appendix 2]

The method of manufacturing the optical fiber according to Appendix 1,

- in which, in the cooling, the dry air is supplied to the contactless guide through a gas filter having filtration accuracy of 0.03 μm or less.

[Appendix 3]

The method of manufacturing the optical fiber according to Appendix 1 or Appendix 2,

- in which, in the cooling, a supply amount of the dry air supplied to the contactless guide is adjusted by an on-off valve having no metal sliding portion.

[Appendix 4]

An optical-fiber manufacturing apparatus including:

- a melting device configured to melt an optical fiber preform to draw a bare optical fiber from the optical fiber preform;
- a cooling device configured to cool the bare optical fiber;
- a supplying device configured to supply a gas to the cooling device; and
- a coating device configured to form an optical fiber by coating the bare optical fiber with a resin,
- in which the cooling device includes at least three contactless guides configured to cause the gas to be ejected from an inner side toward an outer side to change a traveling direction of the bare optical fiber in a contactless manner, and
- in which the gas supplied from the supplying device to the contactless guides is dry air managed to have a dew point of 0 °C or less.

[Appendix 5]

The optical-fiber manufacturing apparatus according to Appendix 4, further including:

a filter disposed between the contactless guides and the supplying device, in which the filter is a gas filter having filtration accuracy of 0.03 μm or less.

[Appendix 6]

The optical-fiber manufacturing apparatus according to Appendix 4 or Appendix 5, further including:

an on-off valve disposed between the contactless guides and the supplying device and configured to adjust a supply amount of the dry air supplied to the contactless guides, in which the on-off valve is an on-off valve having no metal sliding portion.

REFERENCE SIGNS LIST

1, 1A manufacturing apparatus
2 optical fiber preform
3 drawing furnace
4, 4A, 4B cooling portion
4*a* housing
5 coating portion
6 hardening portion
7 bottom roller
8 pulling roller
9 winding portion
10 bare optical fiber
11 optical fiber
20, 21, 22, 22A, 23, 24, 25, 26, 27, 28, 29 contactless guide
30 first flange
32 peripheral wall portion
32*a* outer peripheral surface
35 second flange
37 peripheral wall portion
37*a* outer peripheral surface
40 guide portion
45 buffer groove
46 air passage
47 ejection port
50 traverse device
60 gas supplying device
60*a* gas supply source
60*b* dryer
60*c* dew point meter
61 control device
62 filter
63 on-off valve
68 sealing member
80 gap
81 fiber insertion portion
82 fiber extraction portion
84 air-escaping portion
B circle
C center axis
D1 winding diameter
D2 outer diameter
H pitch width
L horizontal distance
L11 traverse distance
L20 total winding length
L21, L22 winding length
L30 total aerial length
L31 aerial length
S internal space
θ angle

What is claimed is:

1. A method of manufacturing an optical fiber, the method comprising:

melting an optical fiber preform and drawing a bare optical fiber;

cooling the bare optical fiber by a plurality of contactless guides while changing a direction of the bare optical fiber by the plurality of contactless guides; and coating the bare optical fiber with a resin, wherein each of the contactless guides includes a guide portion extending along an outer peripheral surface, the guide portion being configured to allow a portion of the bare optical fiber to be wound around the guide portion, and the guide portion has an outlet through which a gas for floating the bare optical fiber is blown out, wherein a capacity of cooling the bare optical fiber is controlled by adjusting a position of at least one contactless guide of the plurality of contactless guides and increasing or decreasing a winding length of the bare optical fiber with respect to the plurality of contactless guides, the winding length being a length of a portion of the bare optical fiber directly contacted by the gas, and wherein, among the plurality of contactless guides, contactless guides adjacent to each other in a traveling direction of the bare optical fiber are spaced apart from each other in a vertical direction, and wherein the plurality of contactless guides are disposed at regular intervals such that a pitch width H between the plurality of contactless guides is larger than an outer diameter D2 of each of the plurality of contactless guides.

2. The method of manufacturing the optical fiber according to claim 1, wherein at least one contactless guide of the plurality of contactless guides is a moving contactless guide configured to be able to traverse in a horizontal direction, and wherein the capacity of cooling the bare optical fiber is controlled by adjusting a traverse distance of the moving contactless guide and increasing or decreasing the winding length.

3. The method of manufacturing the optical fiber according to claim 2, wherein the plurality of contactless guides are an odd number of contactless guides, the odd number being three or more, and wherein, among the plurality of contactless guides, a contactless guide at an even-numbered position from the optical fiber preform is the moving contactless guide, and the winding length is increased or decreased by causing the moving contactless guide to traverse in the horizontal direction.

4. The method of manufacturing the optical fiber according to claim 2, wherein the plurality of contactless guides are four or more contactless guides, wherein, among the plurality of contactless guides, contactless guides other than a first contactless guide and a second contactless guide are each the moving contactless guide, the first contactless guide being closest to the optical fiber preform, the second contactless guide being closest to a device configured to perform coating with the resin, and wherein the winding length is increased or decreased by causing the moving contactless guide at an odd-numbered position from the optical fiber preform and the moving contactless guide at an even-numbered position from the optical fiber preform to traverse in directions differing from each other in the horizontal direction by distances substantially equal to each other.

5. The method of manufacturing the optical fiber according to claim 2, wherein the traverse distance of the moving contactless guide is more than 0 mm and 350 mm or less.

6. The method of manufacturing the optical fiber according to claim 1, wherein, in controlling of the capacity of cooling the bare optical fiber, a degree of cooling is controlled by increasing or decreasing the winding length, and the winding length is increased or decreased in cooling of the bare optical fiber.

7. The method of manufacturing the optical fiber according to claim 1, wherein, in the cooling, a gas is ejected from an inner side of at least one contactless guide of the plurality of contactless guides toward the bare optical fiber, and the gas is dry air managed to have a dew point of 0 °C or less.

8. The method of manufacturing the optical fiber according to claim 7, wherein, in the cooling, the dry air is supplied to the contactless guide through a gas filter having filtration accuracy of 0.03 μm or less.

9. The method of manufacturing the optical fiber according to claim 7, wherein, in the cooling, a supply amount of the dry air supplied to the contactless guide is adjusted by an on-off valve having no metal sliding portion.

* * * * *